United States Patent [19]

Mongiello

[11] Patent Number: 4,541,329
[45] Date of Patent: Sep. 17, 1985

[54] CHEESE COOKING SYSTEM

[76] Inventor: Angelo Mongiello, 1655 84th St., Brooklyn, N.Y. 11214

[21] Appl. No.: 536,595

[22] Filed: Sep. 28, 1983

[51] Int. Cl.$^4$ .................. A01J 25/00; A23C 19/00
[52] U.S. Cl. ........................ 99/455; 99/453; 99/460; 426/36; 426/582
[58] Field of Search ............ 99/452, 454, 456–459, 99/460, 465; 100/104, 126; 426/582, 478, 583, 199, 491, 36; 83/268, 411 A, 437, 467

[56] References Cited

U.S. PATENT DOCUMENTS

| | | | |
|---|---|---|---|
| 2,768,572 | 10/1956 | Drangle | 99/453 |
| 4,112,835 | 9/1978 | Mongiello | 99/455 |
| 4,237,781 | 12/1980 | Charles | 99/459 X |
| 4,244,286 | 1/1981 | Rust | 99/459 |
| 4,368,984 | 1/1983 | Rikker | 366/311 X |

*Primary Examiner*—Timothy F. Simone
*Attorney, Agent, or Firm*—Paul J. Sutton

[57] ABSTRACT

A cheese cooking apparatus and method that includes a cylindrical cheese cooking tank containing temperature-controlled hot water. Stacked upper and lower cylindrical drums having radially extending paddles forming vertically upper and lower cavities are rotated in indexed steps. Sliced cheese curd product is delivered to an upper cavity from where the curd product is passed to a lower cavity after a rotational distance. After another distance, the partially cooked curd product is passed to a delivery station where stretching means for receiving the partially cooked curd product works the product and simultaneously moves it to a discharge station free of the hot water as fibrous cheese product. A cheese curd cutting system delivers sliced curd product to the working tank. Alternatively, a cheese curd feeding system delivers sliced curd product to the cooking tank.

21 Claims, 19 Drawing Figures

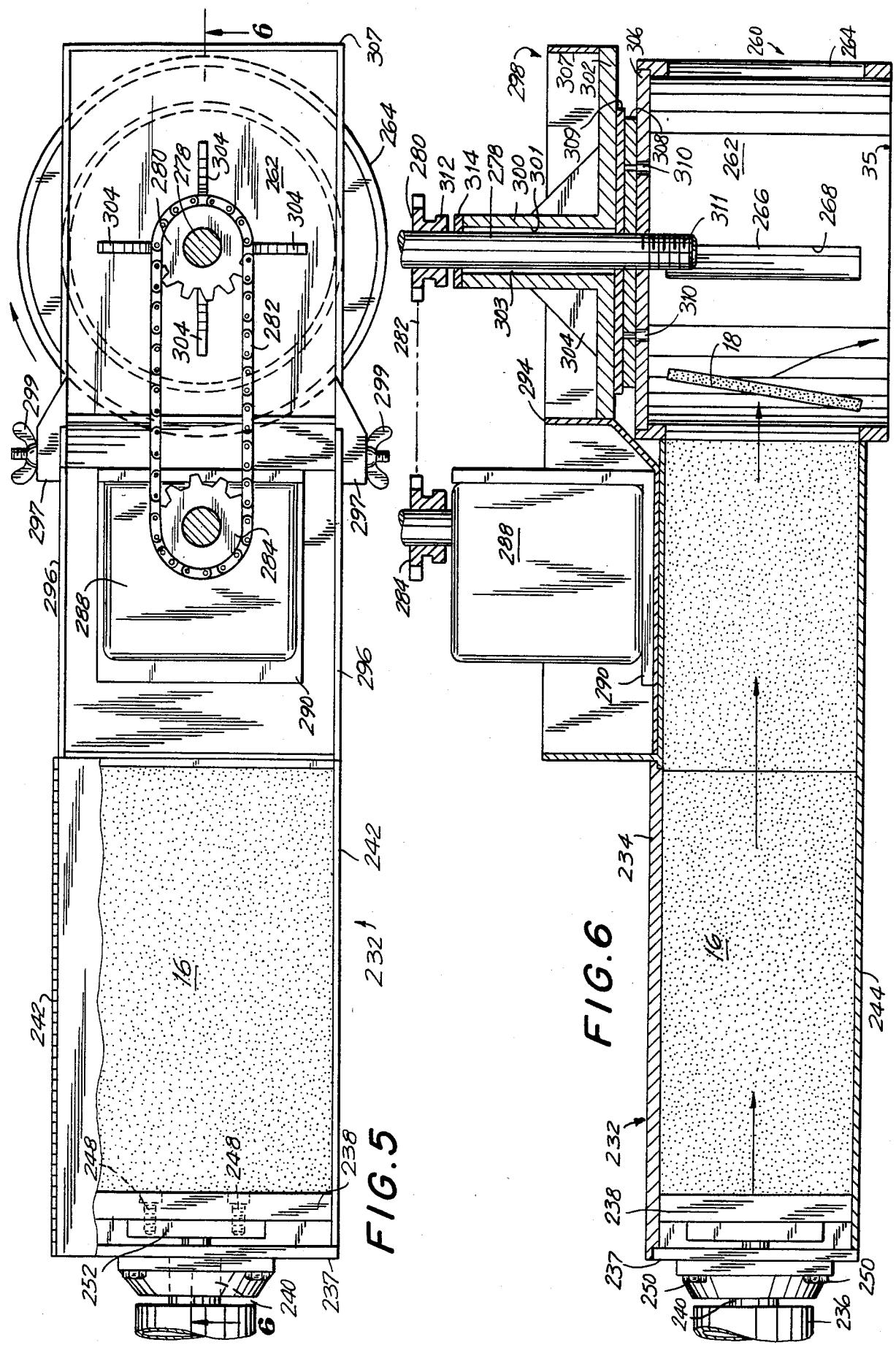

CHEESE COOKING SYSTEM

The present invention relates generally to cheese processing methods and apparatus, and more specifically to an automated system and apparatus for producing mozzarella cheese and/or pizza cheese.

My prior patent, U.S. Pat. No. 4,112,835, describes an automatic continuous processing system for producing fibrous cheeses of the pizza or mozzarella type. The apparatus described there is an important advance in the production of a uniform cheese product which has consistent accuracy in weights, shapes, and sizes and, in addition, solves certain common problems concerning the use of elevated temperatures to cook the cheese curd. Nevertheless, despite the advancements made by my design, there still remains certain problems of butterfat loss from the cheese curd during production. Butterfat loss from the cheese curd during cooking and working of the cheese is undesireable for three reasons. The first is that loss of butterfat from the product into the hot water in which the cheese curd is being worked is simply loss of product. The butterfat content of cheese is what is being sold. When the butterfat content drops, the value of cheese likewise drops. Second, the butterfat escapes into the hot cooking water from which the butterfat has to be reclaimed, which requires expensive equipment and is a production problem. The butterfat which is reclaimed has, in its isolated condition, a lower market value. Third, the taste quality of the cheese is associated with the butterfat content, and loss of butterfat reduces the quality of the taste of the cheese. There is another problem in the industry with regard to the "working" of the cheese and during cooking. Cheese curd of the type of product I am referring to, that is, mozzarella cheese, must be stretched to create a fibrous cheese known in the art. It is a fact that the tendency in the present industry is to overwork the cheese. The method in the industry is first to cut up the cheese into pieces so that the heat is evenly distributed during the cooking process. The pieces are then placed into a ring trough of the type shown in my prior patent. Curd is accepted in the long trough, which has been filled with water at about 120 to 190 degrees, and cooked there. A series of augers horizontally positioned in the trough, or cooker, are rotated so as to "work," that is, stretch, the curd during cooking while at the same time to convey the cooking curd to a molder and cooler apparatus. One fact is immediately apparent in the method used in the industry today, and that is the augers are simultaneously working the curd at the same time the curd is cooking. As far as I can determine, it is a worldwide practice to harass the curd particles before they reach the right temperature for stretchability. Another aspect of the method currently used is that cooking temperatures are 30° to 50° higher than required to produce the product because not enough time is available to simmer the curd. Thus, a forced, hurried heat transfer cycle combines with pressures simultaneously being applied to the curd particles. The result is high fat loss and scalded fine particles of cheese.

Let me make a few other comments regarding the methods and apparatus being used today in the industry. All the equipment being used is adapted to conserve natural resources. One of these resources is the hot water used in the cooking. A recycling tank for the used water has a heating system set into operation after startup of the process. The recycling tank also becomes an accumulator of all the fat losses and scalded fines, or cheese particles, before even an hour has passed from startup time. This recycled water is returned to the cooker, with the result that the cheese curd is really not being worked with hot water but with hot milk, not to say hot cream. The fines which are recycled receive abuse and scalding and sooner or later get caught up with new fresh curd passing through the cooker. This mixing deteriorates the virgin cheese with scalded fines.

It is an object of the present invention to provide an automated cheese cooking system.

Another object of the present invention is to provide an automated cheese working system which moves the cooking cheese through hot water to provide uniform heat transfer without working the cheese.

Yet another object of the present invention is to provide a cheese cooking system which allows the cheese to cook in water of relatively low temperatures.

A further object of my invention is to provide a cheese cooking system that cooks cheese in water of relatively low temperatures and then delivers the evenly and thoroughly heated cheese to a cheese stretching and working device located in the hot water which delivers the cheese to the next step in the process.

A further object of this invention is to provide an automated cheese cooking system which cooks the cheese at a low temperature and works the cheese after cooking and which is compact and takes up very little floor space.

Yet another object of my invention is to provide a cheese cutter adapted to be used with a cheese cooker that cooks the cheese before working the cheese.

Still another object of my invention is to provide an automated cheese cutter that feeds cut cheese to the cooker of the cooking system.

Still another object of my invention is to provide a cheese cooking system that retains a large proportion of the fat in the cheese.

A further object of my invention is to provide a modular cheese cooking system.

Still a further object of this invention is to provide an automated cheese cooking system that includes an automated cheese cutter, an automated cheese worker, and an automated cheese worker that requires very little floor space.

Another object of my invention is to provide a cheese working system that includes augers that work the cheese subsequent to the cheese being fully cooked.

Yet another object of my invention is to provide a cheese cooking system capable of meeting FDA sanitary codes as well as USDA requirements.

Still another object of this invention is to provide a cheese cooking system that can be completely dismantled for internal inspection purposes and reassembled without tools.

A further object of my invention is to provide a cheese cooking system that can be altered by adding modular cooking units.

Another object of this invention is to provide a cheese cooking system that can be dismantled and cleaned in place at low cost.

Another object of my invention is to provide a cheese cooking system that provides at least one tier of paddles forming curd-holding cavities that are moved in indexed rotational increments.

Yet another object of my invention is to provide a cheese cooking system that feeds measured quantities of cut cured product into cavities formed by paddles that are rotated by index movements, the feeding and the rotating being synchronous.

According to one aspect of the present invention, a cheese cooking system is provided which includes a source of temperature-controlled hot water, a cooking tank for receiving, holding, and discharging the hot water. The tank further receives sliced curd product at a receiving station, contains and heats the sliced curd product in the hot water, that is, simmers the curd product, and discharges cooked curd product at a discharge station. At least one horizontal grouping and preferably a pair of stacked upper and lower rotatable drums vertically axially aligned are positioned in the tank and are axially aligned with and rotatably connected to a vertical drive shaft. A plurality of flat, rectangular paddles are radially connected to the drums around the circumference of the drums. A flat circular teflon shelf extends horizontally across the tank between the upper and lower drums to form upper and lower cavities of equal volume and configuration. Preferably 8 paddles are connected to the upper drum and 8 paddles to the lower drum. The upper and lower paddles are so connected to the upper and lower drums as to be continually kept in alignment. The paddles form cavities of equal volume. The upper tier of 8 paddles in the upper compartment form 8 upper cavities and the lower tier of 8 paddles in the lower compartment form lower 8 cavities. Each upper and lower cavity, which also are aligned, includes an angular distance of 45 degrees. A first hole is formed in the shelf at 270 degrees in the rotational direction from the receiving station in the tank. A second hole is formed in the bottom wall of the tank at 270 degrees in the rotational direction from the first hole. The first hole is always aligned with a lower cavity; and the second hole is always aligned with a receiving station. The second hole acts as a discharge station for the cooked curd product, which passes downward into the bottom end of an angular chute, which is connected to the tank and also contains the hot water that is present in the tank. The chute extends from a receiving reservoir below the tank at an angle upwards past the rim of the tank free of the hot water. At least one and preferably two screw conveyors, or augers, are driven to pick up the cooked curd product at the bottom of the chute and work the cooked curd product into fibrous cheese product and deliver the cheese product to a discharge area at the top of the chute for cooling and packaging.

The shaft through the drums is connected to a drive motor by way of an indexing mechanism that includes a ratchet connected to the shaft, a connecting rod from the ratchet, an eccentric connected to the connecting rod, the eccentric being connected to the driver shaft of the motor by way of gearing.

A cheese cutting and delivery stem is associated with the cooking tank. The cutting and delivery system includes an elongated compartment having a bottom wall and two opposed side walls secured to a bottom wall, and elongated compartment having a receiving end and an opposed discharge end. A substantially horizontal air cylinder having a cylinder rod extending into the compartment is positioned proximate to and outside the receiving end of the compartment and includes a substantially vertical ram plate connected to the end of the drive rod and positioned in the compartment adjoining the side walls and substantially normal to the bottom wall. The ram plate is movable between the receiving end and a position proximate to the cylindrical side wall of the cutter body at the discharge end of the compartment. A substantially vertical cylindrical cutter body forming a volume defined by the cylindrical side wall of the cutter is positioned over the receiving station of the cooking tank. The cylindrical side wall of the cutter body forms a plurality of substantially vertical slots having outwardly extending cutting portions adapted to slice the matted curd product and pass the sliced curd product into the cylindrical volume. The cutter body is positioned over the receiving station of the tank and the sliced curd product is directed by the cylindrical volume into the receiving station. The ram head, upon activation of the air cylinder, presses the matted curd into slicing contact with the cutter, which is rotated by a driver. The sliced curd product is pressed downwards into the center volume and falls directly downwards into the receiving station of the cooking tank.

Alternatively, where only pre-cut sliced curd product is used, a sliced curd feeder is provided for receiving, quantifying, and discharging sliced curd into the receiving station of the cooking tank. A housing forms a receiving hopper. A chamber formed in the housing is positioned under the hooper, and a horizontal rotating drum having radially extending paddles forming feeding cavities equal in volume to the cavities of the cooking tank is rotated by a horizontal shaft. The paddles gather a measured quantity of sliced curd product from the hopper and rotates it to a discharge area below the drum. The discharge area is positioned over the receiving station of the cooking tank. The feed motor drive of the shaft is connected to the eccentric of the indexing means of the motor drive of the shaft for the upper and lower paddle tiers so that the feed paddles are driven intermittently at timed intervals in synchronous relationship with the rotation of the paddles of the cooking tank.

Also provided is a matted curd slicer that cuts matted curds into sliced curd and delivers the sliced curd to the receiving station of the cooking tank. The curd slicer includes an elongated box for holding the matted curd product.

My invention will be more clearly understood from the following description of specific embodiments of the invention, together with the accompanying drawings, wherein similar reference characters denotes similar elements throughout the several views, and in which:

FIG. 5 is a top view of the curd cutter;

FIG. 6 is a sectional view taken through line 6—6 of FIG. 5;

Figure 1:
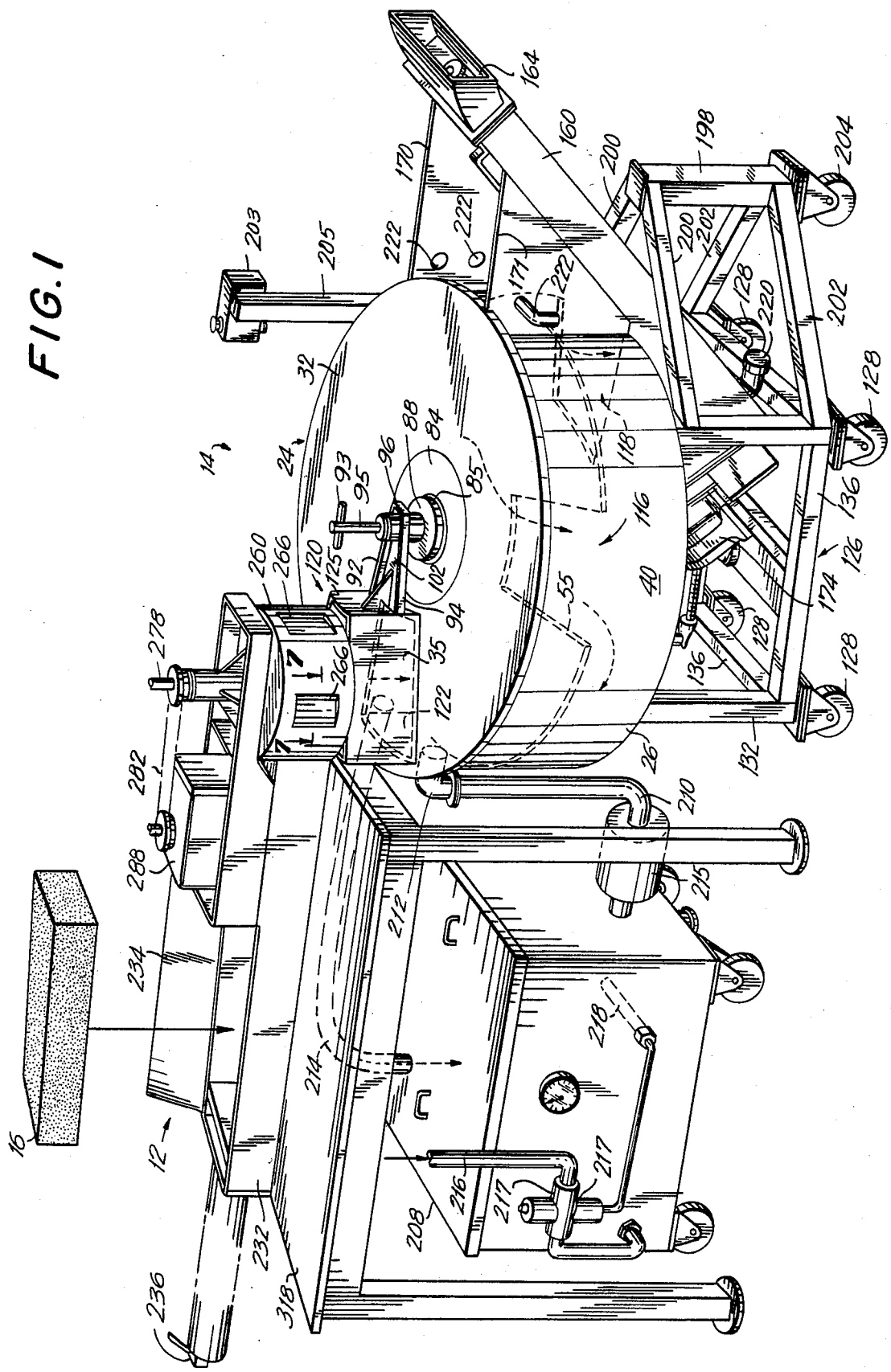
FIG. 1 is a perspective view of the cheese processing system according to the present invention.

Reference is now made in detail to the drawings. An overall perspective view of a cheese processing system 10 including a matted curd cutting system 12 and a curd cooking system 14 are shown in FIG. 1. For purposes of exposition, a detailed description of curd cooking system 14 will be made first. A detailed description of matted curd cutting system 12 will then follow. In general, matted curd cutting system 12 accomplishes the task of cutting matted curd product 16 (FIGS. 1, 5 and 6) into cut, or sliced, curd product 18, which is then transferred to curd cooking system 14 in a manner to be described for heat processing in hot water into cooked curd product 20 and finally for stretching into fibrous cheese product 22.

Figure 2:
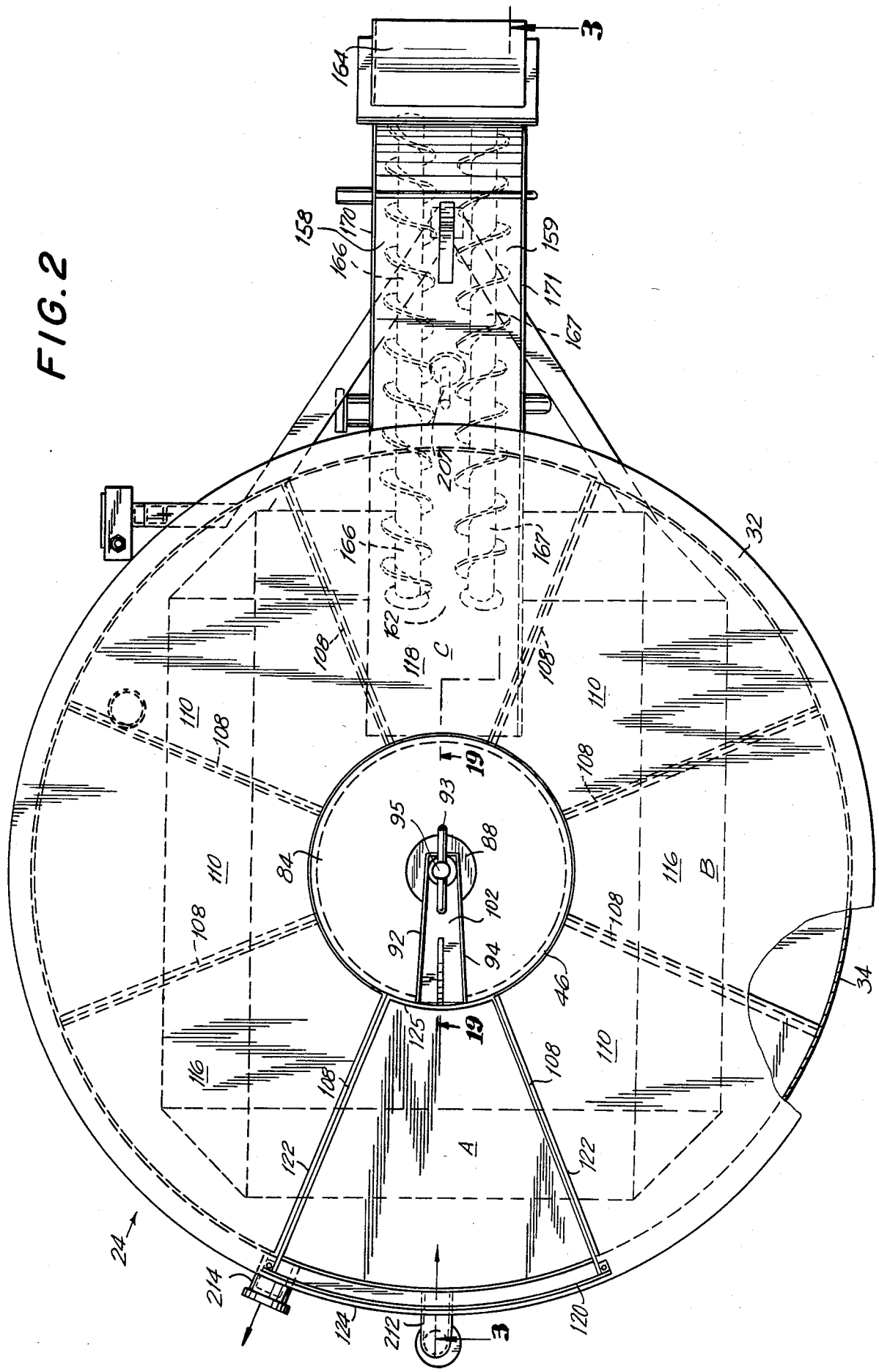
FIG. 2 is a top view of the curd cooker.
Figure 3:
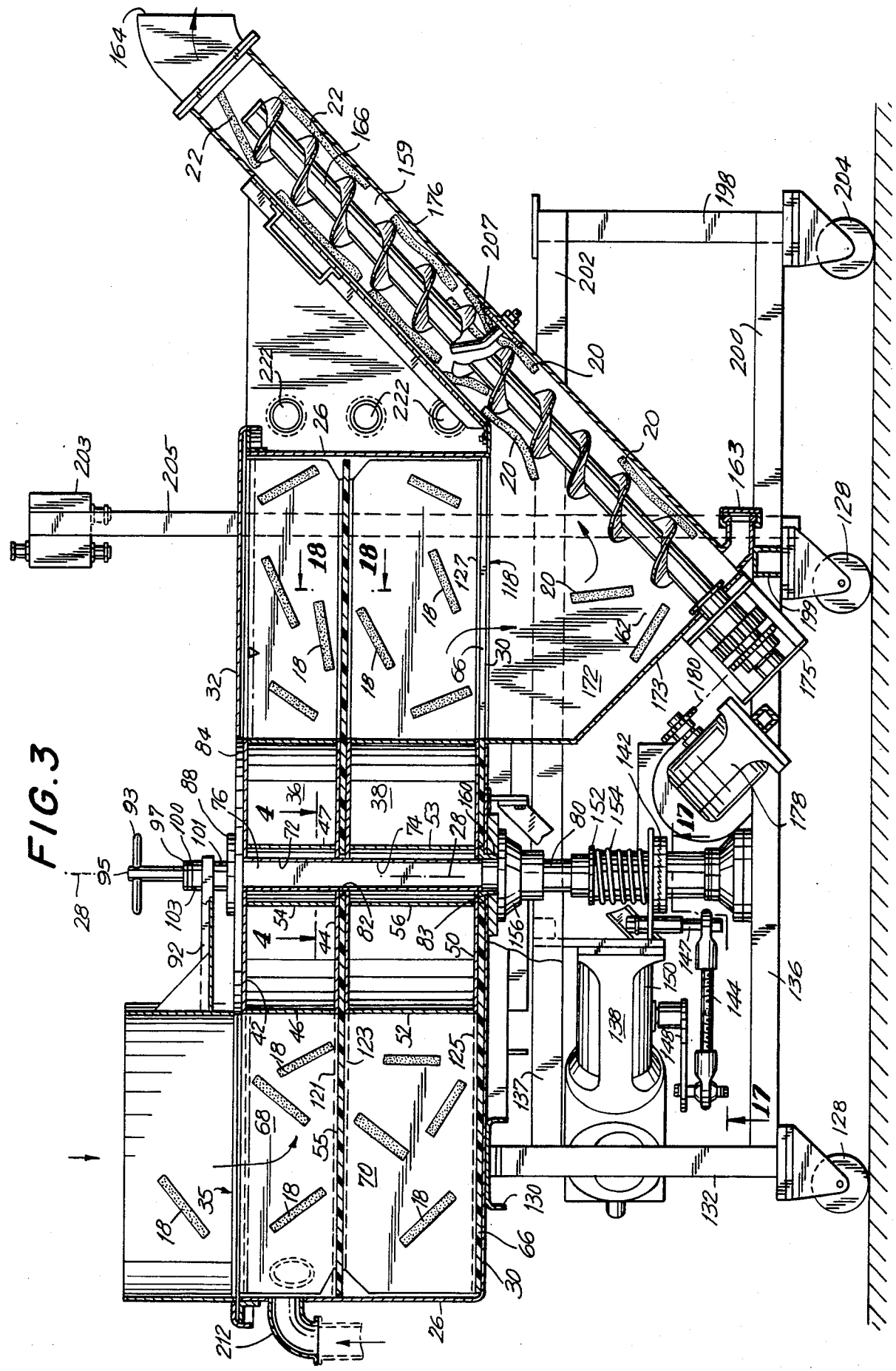
FIG. 3 is a sectional view taken through line 3—3 of FIG. 2.

In accordance with the present invention, curd cooking system 14 as shown in FIGS. 2 and 3 includes a cooking tank 24 defined by cylindrical side wall 26 having a substantially vertical axis 28 and a substantially horizontal bottom wall 30 secured to the bottom edges of cylindrical side wall 26. Cylindrical side wall 26 and bottom wall 30 are preferably stainless steel. Cylindrical side wall 26 has a circular top rim 34 in a plane substantially parallel to horizontal bottom wall 30. Tank 26 is preferably open at the top, which in turn is provided with cylindrical tank cover 32, which will be discussed in detail later.

A pair of equal-sized stacked rotatable upper and lower cylindrical mounting drums 36 and 38 are positioned in tank 24 with the axis of each drum coaxial with tank axis 28. Upper drum 36 has opposed circular, substantially horizontal upper drum covers 42 and 44 intersecting upper drum cylindrical side wall 46. Upper drum 36 is hollow. Lower drum 38 has opposed circular, substantially horizontal top and bottom lower drum covers 48 and 50 intersecting lower drum cylindrical side wall 52. Lower drum 38 is also hollow. The top and bottom covers and side walls of upper and lower drums 36 and 38 are preferably made of stainless steel plate with the covers being secured to the side walls by welding or a similar method. Tank 24 has a tank diameter considerably greater than the diameters of the pair of stacked drums 36 and 38 so that, as shown in FIGS. 2 and 3, a tank compartment 52 is generally defined by tank side wall 26, upper drum top cover 42, upper and lower drum side walls 46 and 52, and a portion of tank bottom wall 30.

Upper and lower drums 36 and 38 are equal in size and configuration and their cylindrical side walls 46 and 52 are equal in height. Upper drum top cover 42 is in the plane of tank rim 34 and lower drum bottom cover 50 is proximate to tank bottom wall 30 and separated from bottom wall 30 by a circular, teflon bottom disk 66 having approximately the same diameter as drums 36 and 38. Shelf 53 extends across tank compartment 40 midway between tank rim 34 and bottom wall 30 to form upper and lower tank compartments 68 and 70, respectively, from tank compartment 52. Upper and lower compartments 68 and 70 are of equal volume and configuration.

Figure 14:
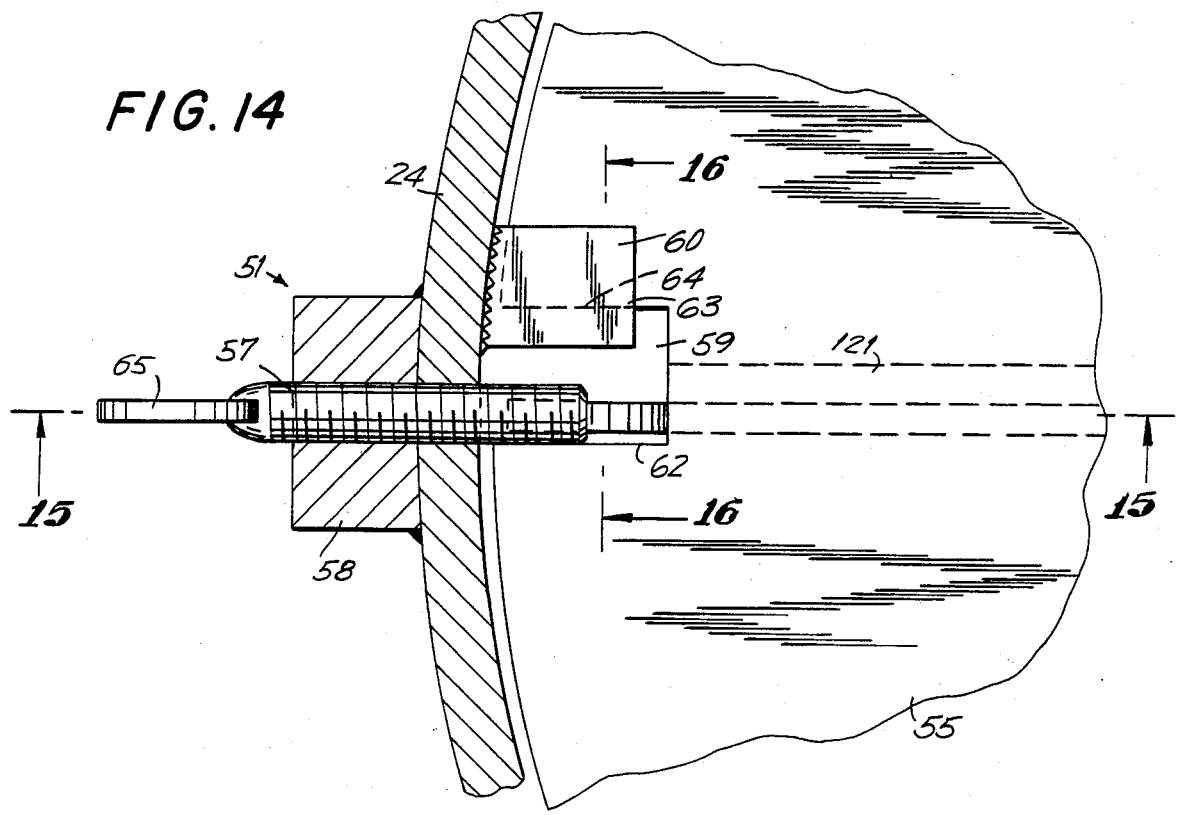
FIG. 14 is a detailed top view of a shelf locking pin.
Figure 15:
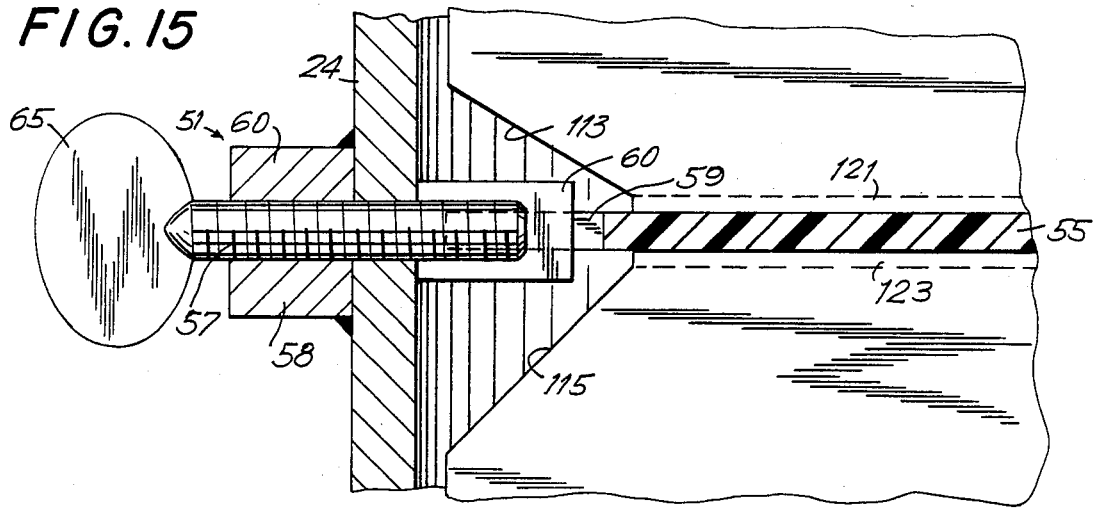
FIG. 15 is a view taken through line 15—15 of FIG. 14.
Figure 16:
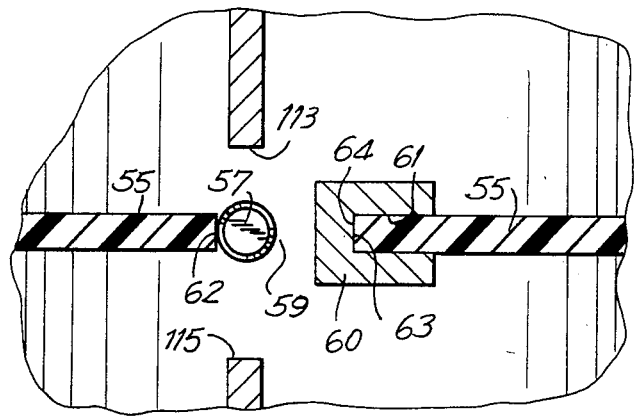
FIG. 16 is a view taken through line 16—16 of FIG. 14.

A circular, flat teflon shelf 55, preferably made of teflon, is horizontally positioned in tank 24 between upper and lower drums 36 and 38 and is in contact with bottom cover 44 of upper drum 36 and top cover 48 of lower drum 38. As seen in FIGS. 14, 15 and 16, shelf 55 adjoins the inner surface of tank side wall 26. Shelf 55 is held in non-rotable association with upper and lower drums 36 and 38 by a locking pin assembly 51 that includes at least one horizontally aligned threaded pin 57 that extends through a mating threaded hole formed in tank cylindrical side wall 26 and in a mounting bracket 58 affixed to the outer surface of side wall 26 into a rectangular aperture 59 formed at the rim portion of shelf 55. The locking assembly also includes a clip member 60 that is affixed to the inner wall of tank cylindrical side wall 26. Clip member 60 forms a horizontal slot 61 that is aligned horizontally with pin 57 and that opens away from pin 57 and also opens inwardly into tank 24. Both pin 57 and slot 61 are vertically aligned with shelf 55 so that a first edge portion 62 of shelf aperture 59 is in adjoining relationship with pin 58 and an opposed second edge portion 63 of aperture 59 is positioned in slot 61 so that second edge portion 63 is in adjoining relationship with inner vertical surface 64 of slot 61. In mounting, pin 57 is to be positioned in a withdrawn position (not shown) from tank 26 so that the tip of pin 57 is withdrawn into tank side wall 26. Shelf 55 is then set upon lower drum 38 and second edge portion 63 of shelf aperture 59 is slid into slot 61 and then rotated counterclockwise as viewed looking downwards as in FIG. 14 until second edge portion 63 is set against inner vertical surface 64 of slot 61. Then pin 57 is rotated via pin handle 65 until pin 57 extends into tank 24 into adjoining relationship with first edge portion 62. As can be most clearly seen in FIGS. 14 and 16, shelf 55 is then locked into a non-rotating association with tank 24 by way of pin 57 and slot inner surface 64 preventing first and second edge portions 62 and 63 from changing position in a clockwise and a counterclockwise direction, respectively. Shelf 55 is removed from tank 24 by unscrewing pin 57 from tank 24 and rotating shelf 55 clockwise after upper drum 36 has been lifted from tank 24, after which shelf 55 can be lifted from tank 24.

Two identical upper and lower stainless steel sleeves 72 and 74 having square in cross-section hollow interiors are formed by four inner walls 47 of upper drum 36 and four inner walls 53 of lower drum 38. Sleeves 72 and 74 are aligned at their cross-sectional centers with tank axis 28. A view of upper sleeve 72 is viewed in horizontal cross-section in FIG. 4. The top edges of upper sleeve 72 are preferably welded to upper drum top cover 42 and the lower edges welded to upper drum bottom cover 44. Similarly, the top edges of lower sleeve 74 are preferably welded to lower drum top cover 48 and the lower edges to lower drum bottom cover 50. Upper drum top and bottom covers 42 and 44 and lower drum top and bottom covers 48 and 50 form square apertures coextensive with inner walls 47 and 53 of sleeves 72 and 74. An upper cylindrical wall brace 54 is positioned in upper drum 36 between top and bottom covers 42 and 44 and spaced outwardly from sleeve 72; and a lower cylindrical wall brace 56 is positioned in lower drum 36 between top and bottom covers 48 and 50 spaced outwardly from slleve 74. Braces 54 and 56 act as structured reinforcement for drums 36 and 38.

Figure 4:
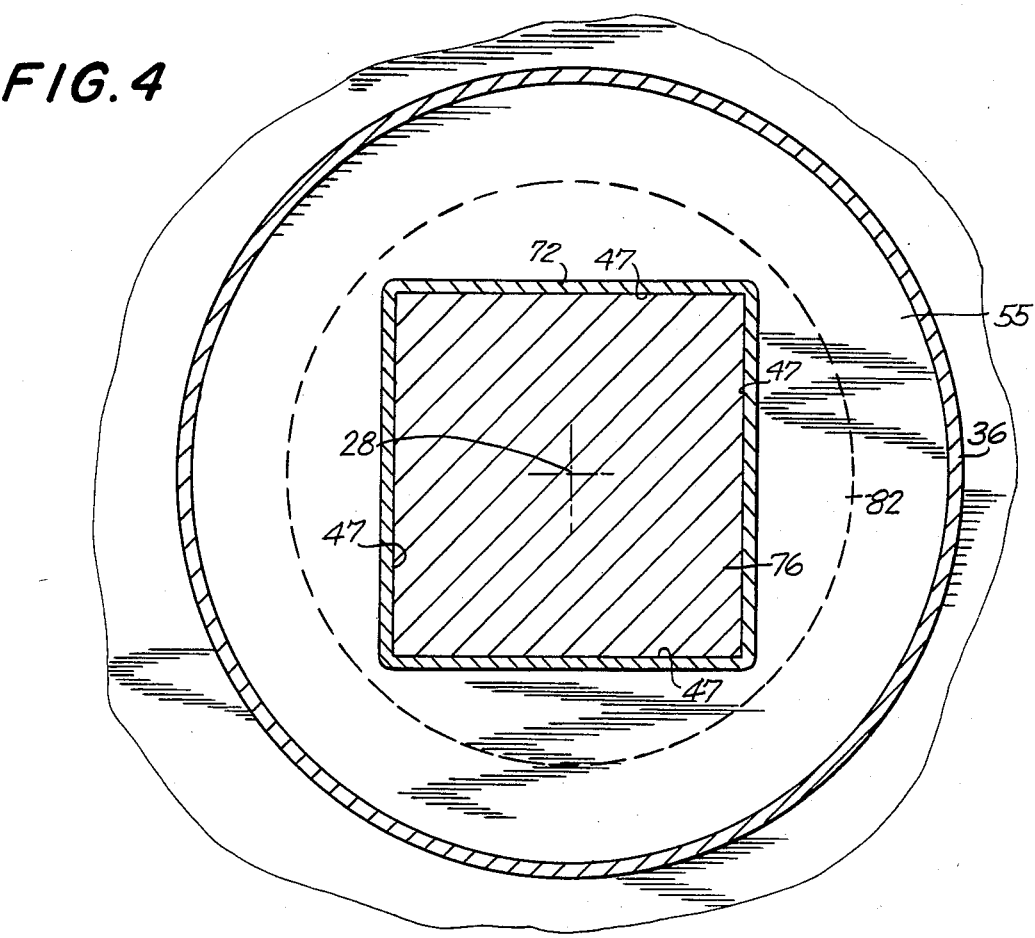
FIG. 4 is a fragmented sectional top view of the shaft and drum of the curd cooker taken through line 4—4 of FIG. 3.

A stainless steel substantially vertical upper shaft 76, which is axially aligned with tank axis 28, extends through sleeves 72 and 74 of upper and lower drums 36 and 38. Upper shaft 76 is connected in one piece to lower shaft 80, which extends below bottom wall 30 of tank 24. Upper shaft 76 is square in cross-section and is slidably positioned in upper and lower sleeves 72 and 74, which are adapted to receive upper shaft 76 in close association. Lower shaft 80 is cylindrical. When lower shaft 80 is rotated in a manner to be explained, upper shaft 76 is likewise rotated so that upper and lower drums 36 and 38 are rotated as upper shaft 76 is rotatably gripped by sleeves 72 and 74. As seen in FIG. 4, teflon shelf 55 forms a central aperture 82. Likewise, bottom teflon disk 66 forms a central aperture 83, which is indicated in the elevational view of FIG. 3. Apertures 82 and 83 have diameters larger than the diametrical distance between the corners of the cross-sectional square of upper shaft 76 and particularly larger than the diametrical distance between the outer corners of square sleeves 72 and 74. Thus, shelf 55 and bottom telfon disk 66 are unaffected by the rotational movement of shaft 76.

Upper and lower drums 36 and 38, it is noted, are hollow and tend to float when stainless steel tank cover 32 is removed from tank 24 so that cover 32 no longer presses drums 36 and 38 down in the water-filled tank. For this reason a hold-down apparatus for drums 36 and 38 is provided, as seen in FIGS. 1, 2, 3, and in particular in detail in FIG. 20. Top cover 42 of upper drum 36 is covered by a teflon gasket 84. Set cover gasket 84 is a steel washer 85 which is welded to a threaded stud 86 that is screwed into a threadway at the top of square shaft 76 at tank axis 28. Stud 86 is also screwed through a nut 87. Gasket 84, washer 85, and stud 86 are welded together to form a single unit. Set over washer 85 is a circular plastic cover 88 having a circular spacer side wall 89 that extends downwards into contact with the top surface of washer 85. A cylindrical vertical T-bar shaft 90 is vertically positioned over cover 88 axially aligned with tank axis 28. Extending downwards and axially connected with the bottom of T-bar shaft 90 is a screw 91 that is screwed into a vertical screw hole 98 in stud 86. Screw 91 and stud 86 are axially aligned with tank axis 28. A T-bar handle 93 is axially mounted over and connected to T-bar shaft 90 via a vertical T-bar rod 95, which is connected to the top of circular horizontal stop member 96, which in turn extends radially outward from rod 95. Stop member 96 is axially aligned relative to T-bar rod 95 and T-bar shaft 90, which are axially aligned with tank axis 28 and shaft 76. A teflon bushing 99 is placed around and is in rotatable association with shaft 90. Bushing 99 extends vertically between stop member 97 and the top surface of plastic cover 88. A flange 100 that extends radially outward from the top rim of bushing 99 has an upper surface that receives the bottom surface of stop member 97. A plastic cylindrical spacer 101 is positioned around the lower portion of teflon bushing 99 with the lower edge of spacer 101 lying upon the upper surface of plastic cover 88.

A product guide 120, which will be discussed in detail later, is positioned over passage 35 formed in tank cover 32. As seen in FIG. 1, product guide 120 includes a pair of horizontally extending braces 92 and 94 that are joined at their ends by a bridge 96 and across their bottom edges by a horizontal flat stiffener plate 102. Stiffener 102 forms a hole adapted to receive teflon bushing 99. The bottom of stiffener plate 102 rests on the top edge of lower spacer 101. A cylindrical stainless steel collar 103 is placed over stiffener plate 102 above plastic spacer 101 and below flange 100; collar 103 is affixed to stiffener plate 102.

In operation, T-bar handle 93 is rotated clockwise to turn screw 91 into stud 86, thus pressing cover 88 via its spacer 89 against washer 85, which is pressed downwards against teflon gasket 84, which in turn is pressed against the top of upper drum 36. As can be seen from FIG. 3, this action presses upper drum 36 downwards upon shelf 55 which in turn is pressed downwards against bottom drum 38. This downward pressing action is sufficient to keep drums 36 and 38 from floating in the cooking water in tank compartment 40. In the assembly described, all parts, including T-bar handle 93, rotate with shaft 76 except teflon bushing 99, cylindrical spacer 101, and collar 103. Stiffener plate 102 acts to prevent the assembly from rocking. In turn, product guide 120 is braced in its position over aperture 35.

As shown in FIGS. 2 and 3, a group of 16 stainless steel, flat, rectangular paddles 108 are positioned in tank compartment 55. Paddles 108 are positioned vertically and are spaced to form 16 cavities 110 each of equal volume. Specifically, paddles 108 are equally distributed into an upper paddle tier 112 of 8 paddles which is positioned around upper compartment 68 and a lower paddle tier 114 of 8 paddles positioned around lower compartment 70. Upper paddle tier 112 forms 8 upper cavities 110 and lower paddle tier 114 forms 8 lower cavities 110. Each cavity 108 is adapted to contain sliced curd product 18. Each paddle 108 of the 8 paddles of upper paddle tier 112 is connected, preferably welded, to upper drum outer side wall 46 and extends radially outward from side wall 46 to a position proximate to the inner surface of tank side all 26. Each paddle 108 of upper tier 112 extends vertically between the plane of tank rim 34 and shelf 55. Likewise, each paddle 108 of the 8 paddles of lower paddle tier 112 is connected by welding to lower drum outer side wall 52 and extends radially outward from side wall 52 to a position proximate to the inner surface of tank side wall 26. Each paddle 108 of lower paddle tier 114 extends vertically between shelf 55 and bottom teflon disk 66 above tank bottom wall 30. The 8 paddles and 8 cavities of upper paddle tier 112 and the 8 paddles and 8 cavities of lower paddle tier 114 are in alignment.

Figure 18:
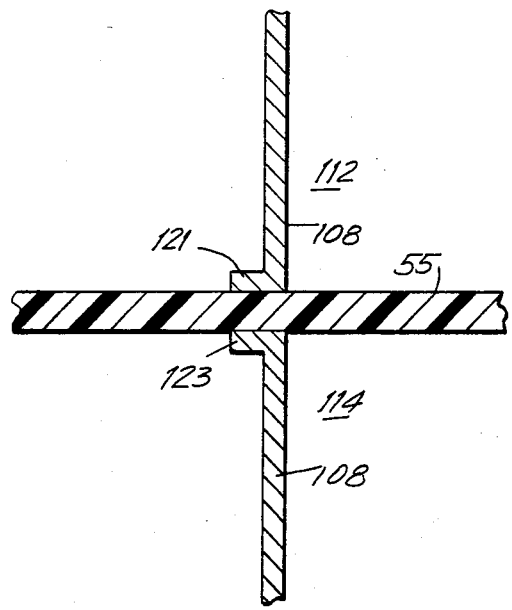
FIG. 18 is detailed side view of the shelf taken through line 18—18 of FIG. 3.

As shown in FIG. 18, each paddle 108 of upper paddle tier 112 has a wiper flange 121 extending from its bottom side; and each paddle 108 of lower paddle tier 114 has a wiper flange 123 extending from its top side. Each wiper flange 121 and 123 adjoins shelf 55 and extends in the direction of clockwise movement of upper and middle paddle tiers 112 and 114. Likewise, as shown in FIG. 3, each paddle 108 of lower paddle tier 114 has a similar wiper flange 127 that adjoins bottom telfon disk 66 and extends in the direction of clockwise movement of upper and middle paddle tiers 112 and 114.

Also, as seen in FIGS. 3 and 14, the lower outer edge of each paddle 108 of upper paddle tier 112 and the upper outer edge of each paddle 108 of lower paddle tier 114 forms respective bevels 113 and 115, which are adopted to pass around locking pin assembly 51.

Upper drum 36 and upper paddle tier 112 form a single unit that can be mounted onto or removed from upper shaft 76 for cleaning purposes. Likewise, lower drum unit 38 and lower paddle tier 114 form another unit that can be mounted onto or removed from upper shaft 76 for cleaning.

Each cavity 110 includes a 45 degree horizontal arc. Shelf 55 forms a first opening 116 co-extensive with any two paddles 108 and a cavities 110 of upper and lower tiers 112 and 114. At a lower cavity 110 in lower paddle tier 114 at 270 degrees from opening 116 measured in a clockwise direction a second opening 118 is formed in tank bottom wall 30 co-extensive with any two of the lower paddles 108 and a cavity 110 of lower tier 114. Bottom disk 66 likewise forms an opening co-extensive with second opening 118 and is also designated also as opening 118. Removable product guide 120 is set over passage 35 of cover 32 at upper paddle tier 112 at a cavity upper tier 112 at a cavity 110 that is 270 degrees clockwise from first opening 116 and 180 degrees from second opening 118. Guide 120 includes a pair of side baffles 122 that are approximately aligned with the two paddles 108 that form the particular cavity 110 over which the guide is set. Guide 120 further includes an outer arcuate baffle 124 connected to side baffles 122 and which is aligned with that portion of top drum side wall 46 over which the guide is set; and an inner arcuate baffle 125 which is aligned with outside wall 46 of upper drum 36.

At this point, rather than continue with the description of construction and arrangement of the embodiment of the invention set forth here, a description of the movement of the curd will make clearer the description of the invention that follows. In brief, cut, or sliced, curd product 18 is delivered in a manner to be described at product guide 120, which sets over an open cavity 110 of cooking tank 24, a delivery point designated as "A" in FIG. 2. Shaft 76 in the embodiment being described revolves in indexed steps of 45 degrees, again in a manner to be described, in a clockwise direction. Because upper shaft 76 is square in cross-section and is positioned in sleeve 72 in turn affixed to drums 36 and 38 it rotates the paddles of both upper and lower tiers 112 and 114 together in an indexed rotational movement to be described thus keeping upper and lower tiers 112 and 114 with their paddles aligned. When the sliced curd product 18 is delivered to the upper cavity at A, the product, which fills the cavity, settles into the hot water to simmer. Pieces of the sliced curd product 18 lie gently on top of one another with space between them because of the irregularity of the cut sizes. As shaft 76 slowly rotates clockwise in the 45 degree indexed step described, the pieces of cut product 18 move free of any pressure that would force them together to form a glob or large piece, which would require a higher temperature for heat penetration. After six indexed movements of 45 degrees, or a total of 270 degrees, the particular cavity being followed is shifted over first opening 116 in shelf 55 where the sliced curd product 18 drops through the hot water to the aligned lower cavity below in lower paddle tier 114, a position designated as "B" in FIG. 2. From point B, the sliced curd product 18 is continued to be gently rotated in six indexed steps clockwise over 270 degrees until the cavity is rotated over second opening 118, designated as point "C" in FIG. 2, through which the product, now having been altered into partially cooked curd product 20, sinks through the hot water for stretching into fibrous cheese product 22 in a step to be described later.

At this point, a description of the present invention relating to the indexed rotational movement of upper and lower tiers 112 and 114 will be made. Cooking tank 24 is set upon a frame 126, which in turn is set up on four wheels 128 set below the four corners of the frame. Frame 126 preferably includes three horizontal channels 130 connected to the undersides of tank 24 except the side under second opening 118. Four vertical support tubings 132 are connected to the ends of channels 130. A pair of horizontal upper tubings 134 brace the upper portions of vertical tubings 132 and two pairs of opposed lower horizontal tubings 136 connect the lower ends of vertical support tubings 132. A crossbrace 137 connects the midpoints of a pair of lower tubings 136. Four wheels 128 are connected to the lower ends of vertical tubings 132. The frame elements described are preferably stainless steel and connected by molding. Additional frame elements will be discussed later.

Figure 17:
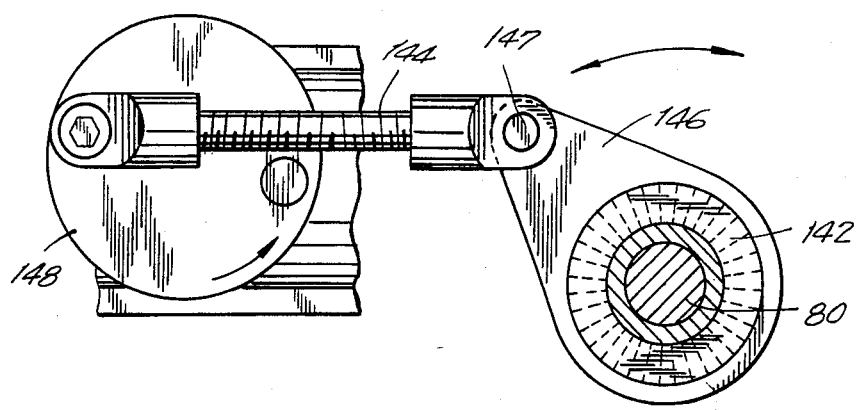
FIG. 17 is a detailed bottom view of the indexing eccentric mechanism taken through line 17—17 of FIG. 3.

A motor 138 mounted upon frame 126 below first opening 116 drives an indexing mechanism 140 which in turn is connected to lower shaft 80, which is cylindrical and connected to and rotates upper shaft 76. A toothed ratchet assembly 142 (FIG. 17) is keyed to lower shaft 80. Toothed ratchet 142 assembly is provided preferably with 24 matching ratchet teeth so that the ratchet is rotated 3 teeth for each indexed movement of the upper and lower tiers 112 and 114. Ratchet assembly 142 is swung back and forth by connecting rod 144 which is connected to ratchet connecting plate 146 by vertical connecting rod 147 at one end and eccentric 148 at the other end. Eccentric 148 is in turn connected to gear box 150 which is in turn connected to the horizontal drive shaft of motor 138. The speed of motor 138 can be varied so as to control the time between movements of ratchet assembly 142 and consequently the cooking time of sliced curd product 18 in cooking tank 24. A helical compression spring 154 is positioned around bottom shaft 80 above ratchet assembly 142 below upper bearing 156. Spring 154 is braced under annular flange 152 mounted to shaft 80. Spring 154 is pressed upwards during high point ratchet teeth movements and urges the upper ratchet teeth downwards into ratchet contact after the upward movements. Shaft 80 extends through an aperture in the axial center of tank bottom wall 30 and disk 66. Above bottom wall 30 and bottom teflon disk 66 square upper shaft 76 begins. A seal 160 is placed around lower shaft 80 at the aperture for lower shaft 80.

A stainless steel chute 160 is connected to cooking tank 24 with an inlet portion 162 positioned directly below second opening 118 and an outlet portion 164 positioned above the plane of tank rim 34 spaced from the rim. Chute 160 is disposed at a selected angle and is radially oriented relative to tank side wall 26 at 270 degrees clockwise from first opening 116. Chute 160 forms a pair of parallel V-shaped channel portions 158 and 159 in which are disposed a pair of screw conveyors, or augers, 166 and 167 that extend between inlet, or receiving, portion, or station 162 and outlet, or discharge portion, or station 164. A pair of side sheets 170 and 171 extend from either side of chute 160 to tank side wall 26 between top rim 34 and tank bottom wall 30 and further extend from either side of the lower portion of chute 160 to tank bottom wall 30 joining with angled cross plate 173 to form a lower receiving reservoir 172 for partially cooked curd product 20 passing through second opening 118 to chute inlet portion 162. Chute 160 and receiving reservoir 172 contain the hot cooking water present in cooking tank 24.

Each auger drive mechanism includes an auger motor 178 mounted to frame 126 and a pair of sprocket and chain mechanisms 180 connected at one end to the drive shaft of the motor and at the other end to the auger bases via a pair of modular gearing units 175. FIG. 3 shows only one of the pair of modular gearing units 175, each of which is mounted on frame 126 at the bases of augers 166 and 167.

Chute 160 is formed by side sheets 170 and 172 and cross-plate 173 that is connected to the bottoms of sheets 170 and 171. In addition, it is supported by a pair of lower horizontal braces 200 that extend in a horizontal "V" pattern from connection at the lower corners of frame 126 for connection with the bottom of a vertical brace 198. A pair of lower horizontal braces 202 aligned with lower braces 200 preferably also connect to vertical brace 198 and to the corners of frame 126 at a pair of vertical tubings 132. A cross-brace channel 199 is set across the bottom of reservoir 172. A fifth wheel 204 is positioned under vertical brace 198. As cooked curd product 20 is raised upwards in chute 160, the product is kept inside of the chute by a removable top plate 206 that extends across the top of the chute.

Cooking tank 24 is provided with hot water at a selected controlled temperature ranging between 130° F. and 180° F. by a recycling hot water covered heating tank wagon 208 (FIG. 1) that can be heated by a known method such as by steam. A hot water feed pipe 210 extends from the tank wagon to an inlet pipe 212 positioned under paassage 35 of cooking tank 24. A gravity feed return line 214, shown in phantom in FIG. 1, extends from the side of cooking tank 24 to the tank wagon. Centrifugal pump 215 is positioned between the wagon 208 and feed pipe 210. Steamline 216 passes through temperature control 217 en route to wagon 208. Thermostat 218 is positioned wagon 208 and connects to control 217.

Cooked curd product 20 upon passing downwards into receiving reservoir 172 settles upon one channel or the other of the pair of V-shaped channels and angularly upon the two augers 166 and 167 which commence the process of slowly and gently stretching cooked curd product 20 between inlet portion 162 and outlet portion 164. This stretching takes place in the hot water at the same controlled temperature as in cooking tank 24. The cooked curd product 20 upon the completion of the stretching process at outlet portion 164 has become fibrous cheese product 22, at which point it is delivered for cutting and packaging processes out of the hot water.

As shown in FIGS. 2 and 3, a hook 207 is positioned between augers 166 and 167 midway up V-channels 158 and 159. Hook 207 is preferably bent away from the upwards movement of cooked curd product 20. Hook 207 is fastened by a bolt to bottom plate 173 of chute 160. Hook 207 aids in the stretching process as cooked curd product 20 is drawn up chute 160.

FIGS. 1, 2 and 3 illustrate a motor control box 203 that holds manually controlled start/stop switches for motors 138 and 178. Control box 203 is affixed to the top of vertical mount 205, which is attached to frame 126. Electrical conduit (not shown) connecting box 203 to motors 138 and 178 are held by mount 205.

A drain 220 for tank 24 is provided at the bottom of reservoir 172. In addition, reservoir 172 is provided with a series of hot water levelling tap outlets 222 that can be selectively tapped so as to maintain the water level in the tank at a lower level than full if desired.

Figure 12:
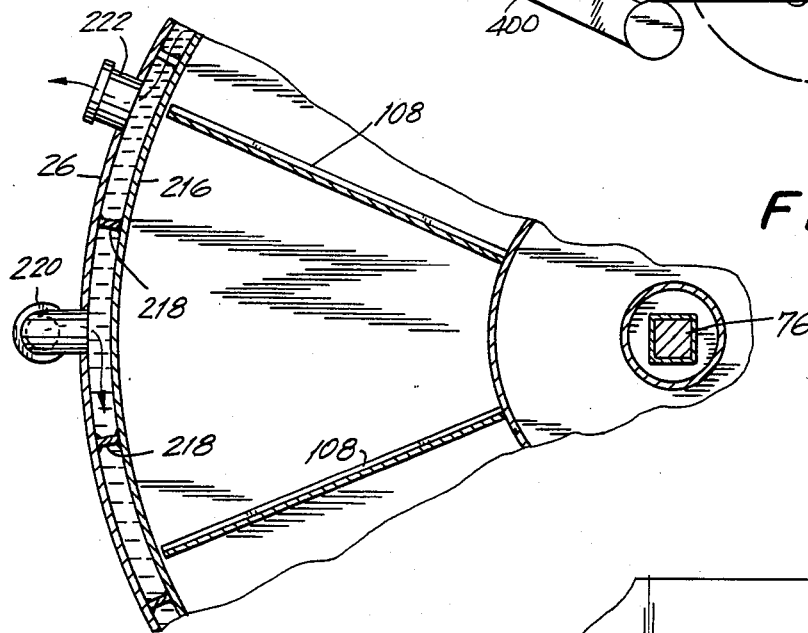
FIG. 12 is a detailed schematic sectional view of the tank steam jacket.

Cooking tank 24 can be heated by other methods. For example, a steam jacket 224 can be constructed around the sides, or the bottom, of cooking tank 24, as shown in the detail cross section in FIG. 12. Vertical fins 226 that are staggered top-to-bottom, bottom-to-top, hold the jacket to tank side wall 26. Steam inlet and outlet 227 and 228 are provided, as is a condensate drain (not shown).

Another method of heating the hot water in cooking tank 26 is a hot water jacket similar to steam jacket 216 into which hot water from a hot water tank wagon is fed. In such a case, two hot water tank wagons could be provided, one for heating the cooking water in the tank and another for providing hot water to the hot water jacket for heating. These heating methods are known in the art.

Sliced curd product 18 is delivered to curd cooking system 14 at product guide 120 at point A by curd cutting system 14 shown in FIGS. 1, 5, and 6. An elongated product box 232 preferrably of stainless steel, open at the top, is adapted to receive matted curd product 16. A hinged cover 234 shown as open is closed and held shut by a latch (not shown) when the product is in the box. The cover can be closed by hand or by tripping a limit switch button. An air cylinder 236 horizontally positioned outside end wall 237 of box 232 which in turn is connected to a pressured air system. A preferably plastic centrally positioned pusher plate, or ram head, 238 connected to the cylinder rod 240 is slidably mounted in box 232 and extends in both vertical and horizontal directions to slidingly engage side walls 242, bottom wall 244, and to a position proximate to closed cover 234 of box 232 as shown in FIG. 6. An aluminum plate 246 is secured to the outside of box end wall 237 by four bolts 250. A washer 252 is situated between rod 240 and ram 238 and is secured to the ram by pins 248. A center screw (not shown) secures rod 240 to ram 238.

Figure 7:
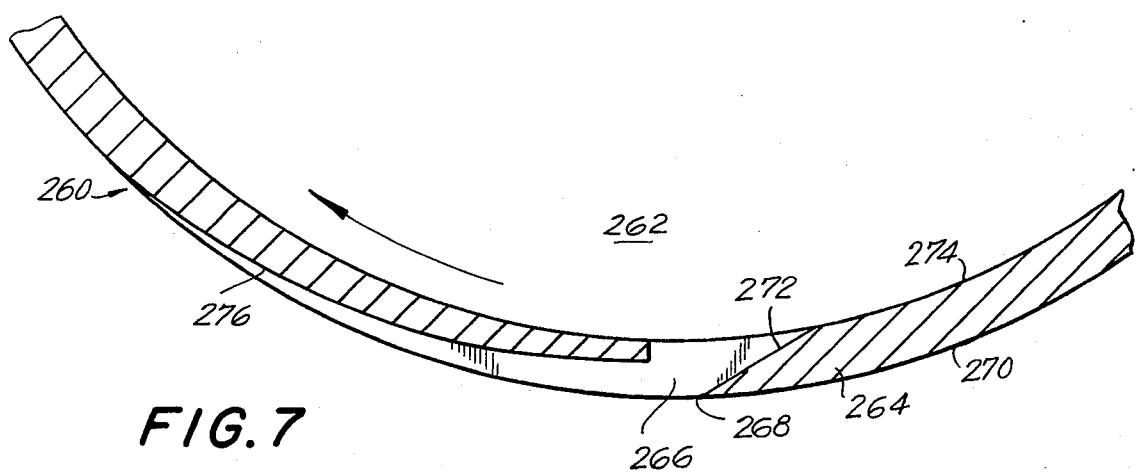
FIG. 7 is a detail view taken through line 7—7 of FIG. 1.

Ram 238 is movable between a withdrawn position as shown in FIG. 6 proximate to end wall 237 and an extending position, as indicated in phantom lines, proximate to curd cutting drum 260, which is situated at the open opposite end of box 232 from end wall 237. Curd cutter drum 260 is cylindrical, vertically positioned, and forms a cylindrical hollow 262 with its cylindrical side wall 264 forming a series of vertical cutting slots 266. Bottom wall 244 of box 232 forms an annular indent at drum end 258 in order to accommodate cylindrical side wall 264 of the drum. As shown in the detail drawing of FIG. 7, a vertical cutting edge 268 positioned at the outer surface 270 of side wall 264 is positioned at one side of each slot 266. A cutting slope 272 angled in side wall 264 between outer surface 270 and inner surface 274 of side wall 264 is angled with the rotational movement of cutter 260 to form cutting edge 268 at outer surface 270. Curd matted product 16 that is cut at cutting edge 268 is directed into hollow center 262. The opposite side of each slot 266 from cutting edge 268 is configured by a gentle leading slope 276 angled from outer surface 270 from a vertical position distant from each slot 266 inwardly toward inner surface 274 to a position proximate to inner surface 274. When ram 238 presses matted curd product 16 inwardly at cutting slope 272, the product can be cut by cutting edge 268 as drum 261 is being rotated. As shown in FIG. 5, the drum is being rotated clockwise in the embodiment being described.

Drum 260 is rotated by overhead vertical drum shaft 278, which is driven by drum horizontal sprocket 280, in turn driven by horizontal chain 282 and horizontal motor sprocket 284, which is connected to motor shaft 286, driven by motor 288. Motor 288 is secured to motor bottom plate 290, which is set across and secured to top end wall plate 291 of box 232. Motor end plate 292 is connected to the drum end of bottom plate 290 and extends vertically upwards as shown in cross-section in FIG. 6. A vertical rear wall 294 opposite end plate 292 and a pair of opposed side walls 296 are also secured to bottom plate 290 to complete a motor housing positioned adjacent to product box 232. The motor housing is preferably made of stainless steel.

A drum shaft housing 298, preferably made of stainless steel, encloses a vertical portion 300 forming a vertical shaftway 301 journaled to receive drum shaft 278. Housing 298 includes a horizontal, rectangular base 302 to which vertical portion 300 is centered is connected to motor end plate 292. Drum shaft housing 298 further includes a pair of opposed upright side walls 305 and upright end wall 307 joining side walls 305 and secured to base 302. A teflon sleeve 303 is positioned in shaftway 301. Four opposed web supports 304 additionally secure base portion 302 with vertical portion 300. In this manner, housing 298 is situated as a cantilever from which drum 260 is hung and rotated, as is discussed below.

Drum 260 includes circular top cover 306, preferably made of stainless steel, that is set upon and secured to cutter drum 260 preferably by welding. A circular mounting cover plate 308 is positioned over and secured to drum top cover 306 by pins 310. A washer 309 is positioned between base 302 and mounting cover plate 308 drum shaft 278 is provided with end threads 34 that are screwed into drum cover 306 so that when the shaft is rotated, drum cover 306 rotates along with mounting cover plate 308 and cylindrical side wall 264. Shaft 278 is provided with a flange 312 positioned over vertical portion 300 of housing 298 with teflon spacer 314 placed between flange 312 and portion 300. As shown in FIG. 5, a plurality of opposed pairs of vertical plastic guides 297 are adjustably vertically secured to sidewalls 296 adjacent to opposite sides of drum side wall 264 by wingnuts 299 so as to slidingly align product box 232 with drum 260 during rotation.

From the above description, it can be understood that cutter drum 260 is free to rotate since it is hung from cantilevered drum shaft 278, which in turn is supported by cantilevered housing 298. Both drum shaft 278 and housing 298 are ultimately anchored to product box 232, which in turn is anchored to a horizontal mounting member, such as a table 318.

As illustrated in FIG. 1, curd cutting system 12 is associated with curd cooking system 14 by placement of drum cylindrical hollow 262 over product guide 120. Matted curd product 16 is placed into product box 232. Hinged cover 234 is then closed either by hand or by the tripping of a limit switch button (not shown). Air cylinder 236 is then activated and cylinder rod 240 then forces ram head 238 is product box 232 forward, thus pressing matted curd product 16 against cutting slots 266 of rotating cutter drum 260. The matted curd product is sliced by cutting edges 268 into sliced curd product 18, which drops down through hollow 262 to product guide 270 from where the sliced curd product enters cooking tank 24 at point A to begin the cooking process of the sliced curd product described previously. When ram head 238 has reached a position proximate to cutter drum 260, the ram head trips a limit switch (not shown) to reverse the direction of the air cylinder power stroke. Preferably, ram head 238 has reached its maximum position at the time the air cylinder is signaled to reverse the direction of pressured air flow. Upon full retraction of ram head 238 to its original position adjacent to air cylinder 236, the air cylinder shuts off, the cover of the box is opened, and more matted curd product 16 is placed in the box and the process begins again as described above.

Curd cooking system 14 can be fed by another system in accordance with the present invention, namely, by feeder assembly system 330. Feeder assembly system 330 is used by a cheese processor who does not use matted curd product but rather deals only with curd product delivered to the plant already sliced. In such a case, the sliced curd product 18 has to be guided in quantified units to cooking tank 24 to avoid overlarge deliveries that would stuff or overflow the particular cavity 110 at delivery point A.

Figure 8:
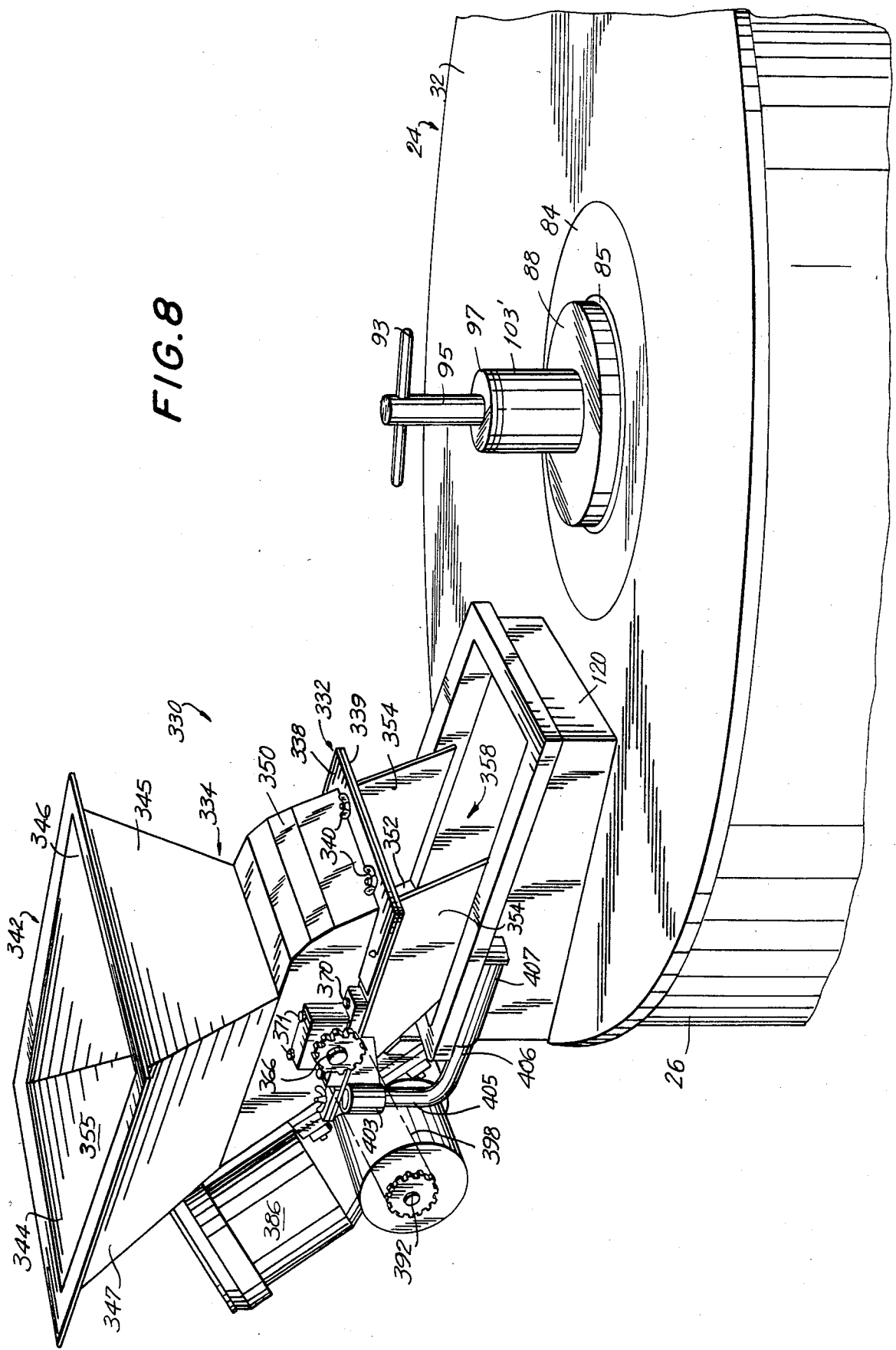
FIG. 8 is a perspective view of the proportional feeder positioned over the cooking tank.
Figure 9:
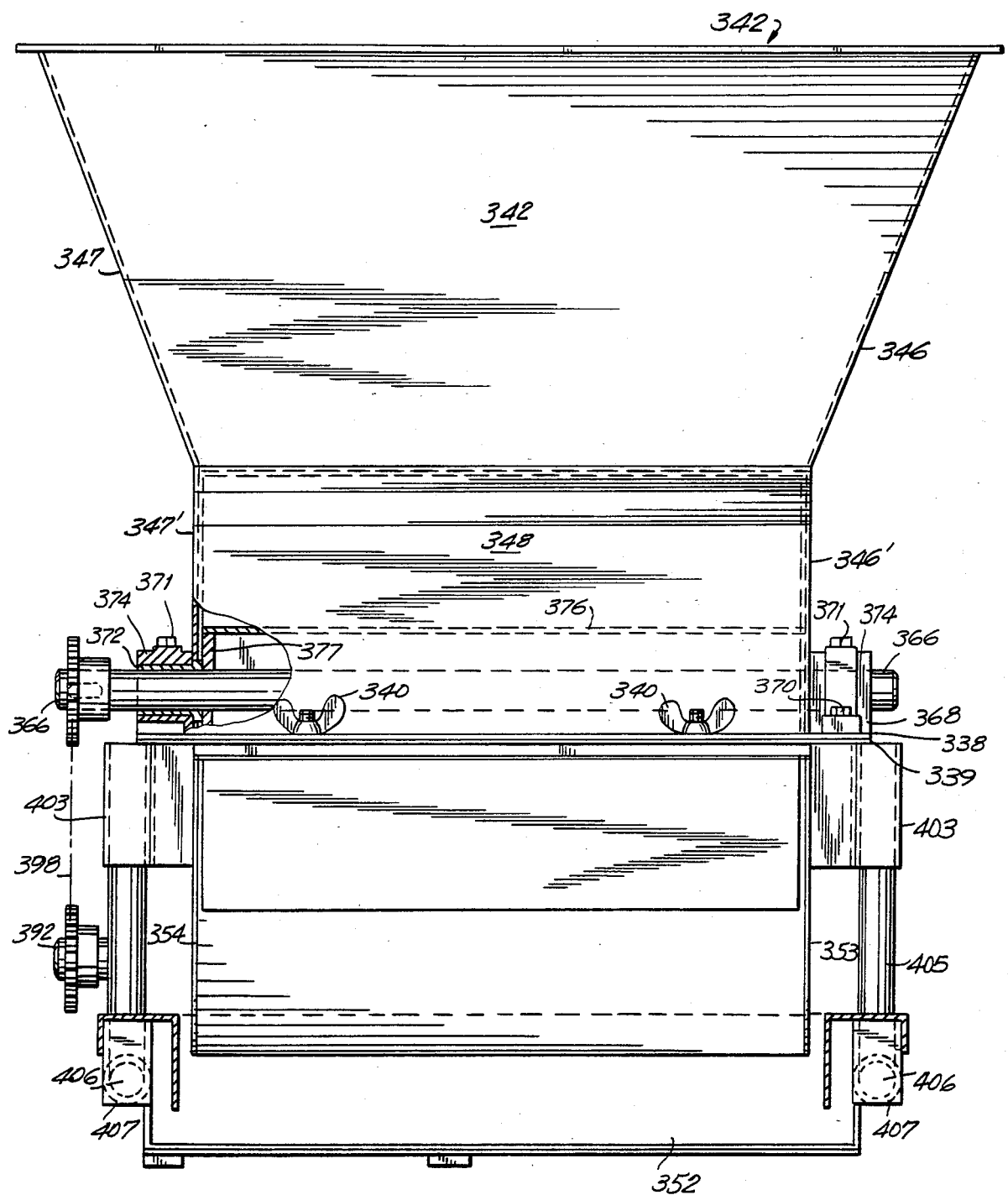
FIG. 9 is a front view of the proportional feeder.
Figure 10:
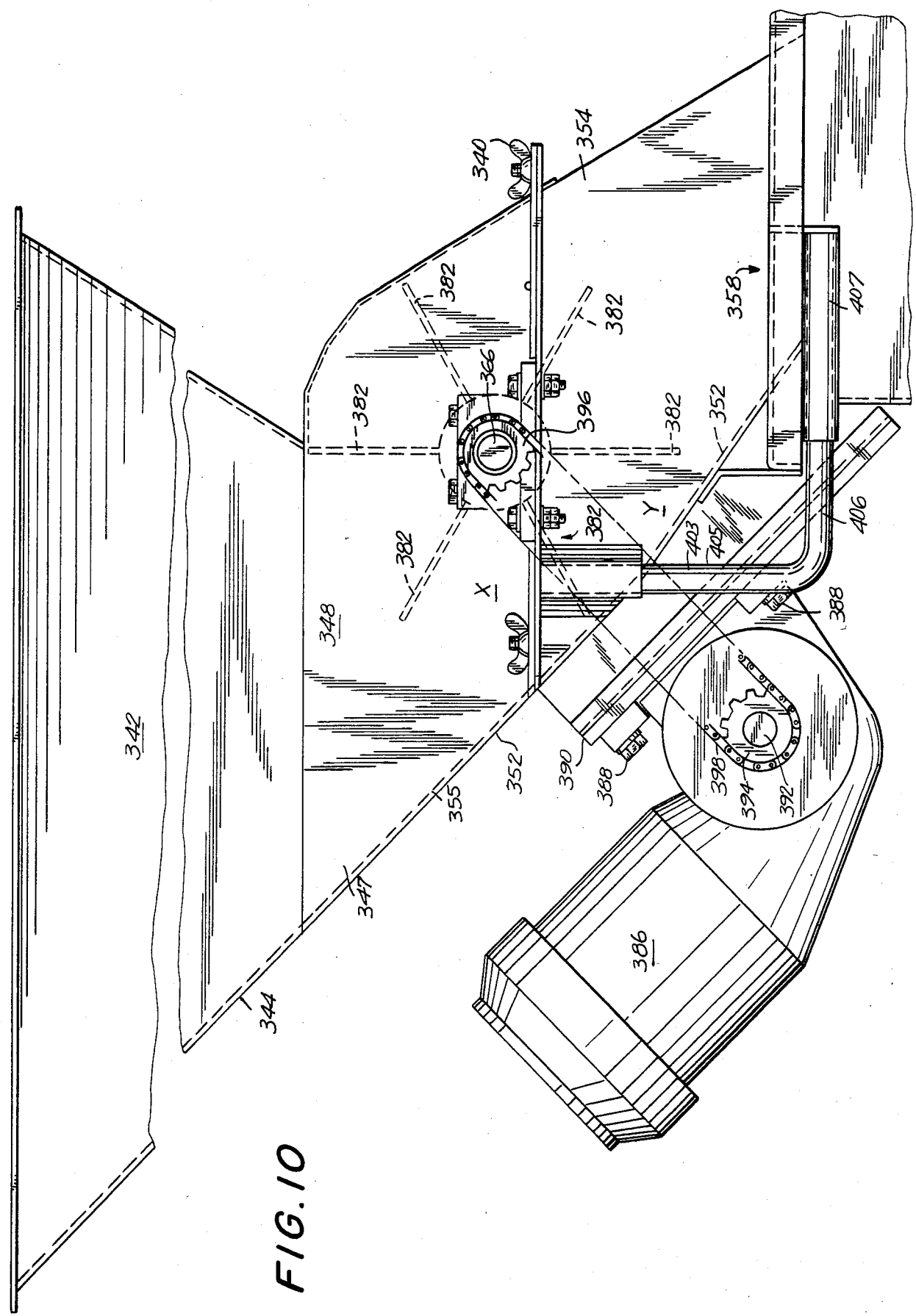
FIG. 10 is a side view of the proportional feeder.

In accordance with this requirement, feeder assembly system 330 as shown in FIGS. 8, 9, and 10 includes a housing 332 that is set over product guide 120. Housing 332 preferably includes an upper housing portion 334 and a lower housing portion 336 secured to the upper housing portion along mating upper and lower flanges 338 and 339 respectively by wingbolts 340. Upper housing portion 334 forms an open-tapped hopper 342 which is formed by opposed, inwardly slanted upper rear and front walls 344 and 345 secured at their edges to the edges of a pair of opposed, inwardly slanted side walls 346 and 347. As seen in FIG. 10, the lower section of upper housing portion 334 forms a chamber 348 situated below hopper 342 formed by slanted upper rear wall 344, vertical side walls 346 and 347 which are connected to the lower edge portions of slanted side walls 346 and 347, and an annular front wall 350 that is joined to the bottom of slanted front wall 345. Lower housing portion 336 includes a slanted lower rear wall 352 (FIGS. 8 and 9) that is joined to the bottom of slanted upper rear wall 344 and together form ramp 355, which is slanted downwards, back to front and exits at bottom exit 358 at the bottom of lower housing portion 336. Lower housing portion 336 also includes a pair of vertical, opposed side guide plates 353 and 354 secured to lower flange 339 and to slanted lower rear wall 352. The guide plates 353 and 354 form an open front side 356 opposite rear wall 352, that is, opposite ramp 355. Ramp 355 and side guide plates 353 and 354 form open bottom exit 358, so that ramp 355 leads from the open top of hopper 342 to bottom exit 358.

Side walls 346 and 347 of upper housing portion 334 form opposing holes positioned directly above lower flange 338 through which a horizontal shaft 336 extends; shaft 336 also extends through chamber 348 and through and beyond walls 346 and 347 and is supported at each shaft end portion by mounting plates 368 secured to lower flange 339 by bolts 370, the mounting plates supporting bushing flange grips 374 that in turn enclose teflon bushings 372 that extend around shaft 366. Tightening bolts 371 are adopted to adjust pressure on grips 374.

Shaft 366 is axially mounted within a horizontal cylindrical drum 376 which has cylindrical vertical end covers 377 and a cylindrical side wall 378 enclosing a hollow interview and which extends between holes 364 in chamber 348 of upper housing portion 334 with opposed end covers 377 positioned proximate to side walls 346 and 347. Shaft 366 is secured to drum 376 preferably by square apertures in covers 377 that are adapted to receive a square inner portion of shaft 366 situated within chamber 348, so that when the shaft is rotated, the drum also is rotated.

Six rectangular flat paddles 382 are radially mounted to drum side walls 378 along the length of drum 376. It is noted here that all parts of the feeder assembly 330 being described are preferably stainless steel unless otherwise indicated and that the connections between the parts are preferably by welding. Each adjoining pair of paddles 382 together with drum side wall 378 forms a feed assembly cavity 384 that has a volume equal to the volume of each cavity 110 of curd cooking system 14 described previously. The top side of each paddle 382 during its counerclockwise rotational orbit (as seen in FIG. 10) passes downward proximate to rear ramp 355, then downward into lower housing portion 336, then upward to pass proximate to annular front wall 350, then into hopper 342 and finally downward to pass proximate to ramp 355 again to receive another load of sliced curd product 18.

Shaft 366 is driven by motor 386, which is secured via bolts 388 to motor mounting plate 390, which in turn is secured to the outside surface of lower rear wall 352 of lower housing portion 336. A motor shaft 392 extends horizontally parallel to shaft 366. A motor sprocket 394 is attached to the end of motor shaft 392 and shaft sprocket 396 is connected to the end of shaft 366, the two sprockets being joined by drive chain 398. When motor 386 is activated, shaft 366 is rotated along with paddles 382.

Sliced curd product 18 is placed in hopper 342 and motor 386 is activated long enough to rotate shaft 366 for a turn of one-sixth of a rotation, or 60 degrees. Sliced curd product 18 contained in the particular cavity 384 above ramp 355, indicated as "X" in FIG. 10, is spilled down ramp 355 when the rotational movement of 60 degrees is made and the particular cavity 384 is moved to position "Y".

Figure 11:
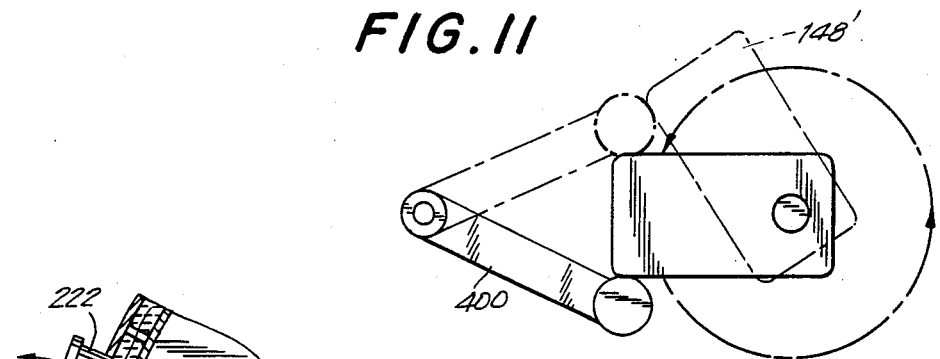
FIG. 11 is a detailed view of the indexed trip switch of the proportional feeder.

Motor 386 is activated by way of a signal sent from limit switch 400 shown in FIG. 11 that is rotatable so as to trip the limit switch and send a signal to activate motor 386 when eccentric 148 of indexing mechanism 140 is rotated against the limit switch. The limit switch is automatically rotated back to "off" position after eccentric 148 has fully passed. The return rotation of the switch is accomplished by biasing means known in the art.

Feeder assembly system 330 is fastened over cooking tank 24 by a mounting system that includes a pair of vertical tubings 403 connected to the underside of lower flange 339 at opposite side walls 346 of housing 332. A pair of support rods having a vertical portions 405 and horizontal portions 406 have their vertical portions 405 set upwards into vertical tubings 403. A pair of horizontal tubings 407 (FIG. 8) are mounted to opposite sides of side wall 26 of tank 24. Horizontal portions 406 are set into the open ends of horizontal tubings 407. Horizontal tubings 407 are affixed to side baffles 122 proximate to the top rim 411 of the cooking tank. When the feeder assembly is mounted, ramp 355 is set slightly inside of tank side wall 26 at top rim 411, and side guide plates 353 and 354 of lower housing portion 336 are associated with a pair of paddles 108 over cavity 110 at position A.

Figure 19:
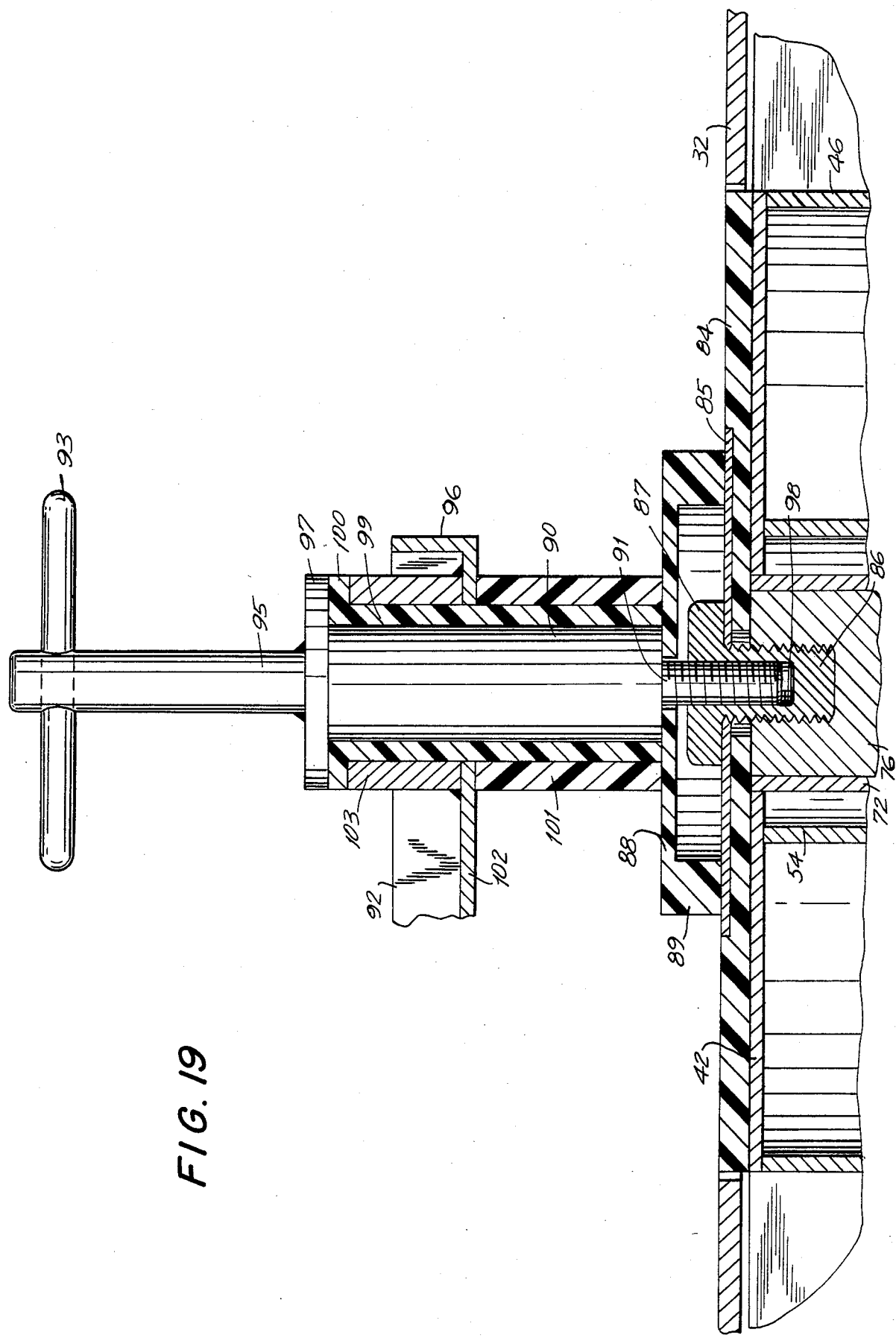
FIG. 19 is a detailed side view of the T-bar assembly taken through line 19—19 of FIG. 2.

The T-bar hold-down assembly shown on FIG. 8 is similar to the T-bar assembly previously discussed with regard to FIG. 19, except that a stainless steel collar 103' extends between stop members 97 and plastic cover 88.

The elements of the curd cooking system 14 described above are all demountable and remountable for cleaning purposes. After unscrewing and removing locking T-bar 93, each upper and lower tier 112 and 114 with its connected upper and lower drum 36 and 38 can be lifted from tank 24 along with shelf 55 and the disks 66 for cleaning and then easily replaced. Augers 166 and 167 can likewise be removed and cleaned along with chute 160. Similar demountable features apply likewise to the elements of curd cutting system 230 and feeder assembly system 330.

The temperature ranges of the cooking water in the cooking tank 24 can be selected over a 130 to 190 degree range as compared to a 160 to 190 degree range limitation for the prior art. The reason that lower cooking temperatures can be used in the present invention is that cooking time can vary up to 7 minutes as compared to 3 minutes cooking time maximum in the prior art. The present invention provides a circular moving length of cooking, where the cut curd is gently moved, that would be impractical in the straight-line cooking length of the prior art, which would take up too much space. The loss of butterfat content in the present invention is kept to a minimum because no stretching, harassing, or pulling of the cut curd product takes place during cooking; only a gentle motion occurs that does not remove butterfat.

The embodiments of the invention described and disclosed are presented merely as examples of the invention. Other embodiments, forms, and modifications coming within the proper scope and spirit of the appended claims will, of course, readily suggest themselves to those skilled in the art. For example, rather than the two stacked paddle tiers as described a single tier could be used, or three, four, or more stacked tiers could be employed. Also, a series of offset stacked cooking tanks each with its own paddle tier could be used, with the stacking of the tanks being offset to accommodate the mating of exiting and entering apertures. Also, a cooking tank with a drum and paddle tier that is vertically aligned, rather than horizontally as in the embodiment described herein, could easily be accomplished by strengthening the sides of the vertical tank and adjusting the entering and exiting apertures for the curd product. In such a configuration, the paddles would act in the manner of a water paddle wheel.

Figure 13:
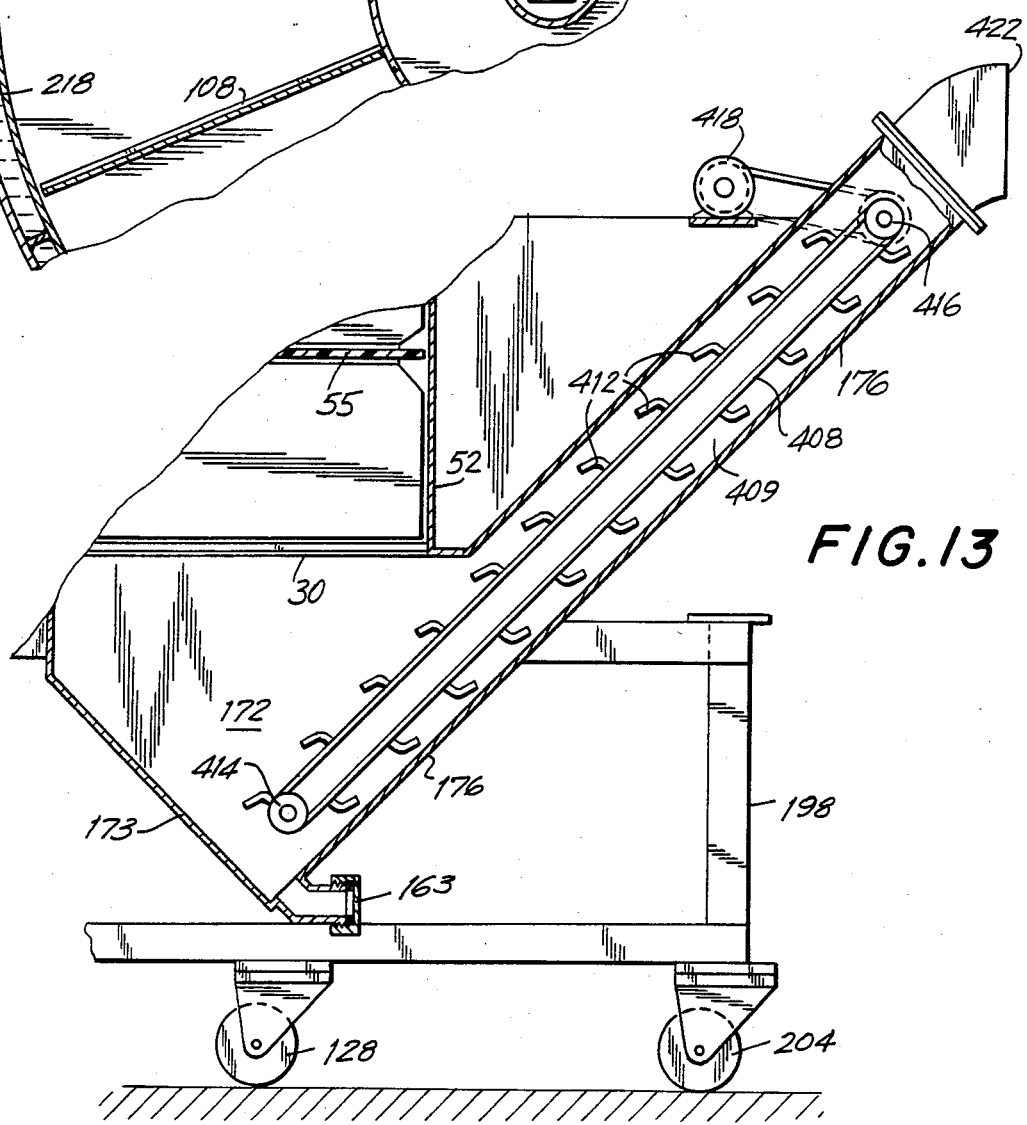
FIG. 13 is a schematic view of a conveyor hook mechanism.

Finally, the augers 166 and 167 described herein for working the cooked curd product 20 into fibrous cheese product 22 can be replaced by an alternative embodiment. For example, as shown in the schematic illustration of FIG. 13, at least one continuous conveyor 408 is positioned in chute 409 attached to cooking tank 24. A series of grapples, or hooks, 412 are attached to the continuous conveyor 408, which moves around opposed sprocket wheels 414 and 416 which in turn are driven by a motor 418 mounted at the top of chute 409. When cooked curd product 20 falls to the bottom of reservoir 20 at the bottom of chute 409, the moving hooks 412 pull the cooked curd product upwards, stretching the product into fibrous cheese product 22 and delivering the finished cheese product to a delivery station 422 at the top of chute 409. The details of the gearing and drive mechanism between motor 418 and sprocket wheels 414 and 416 are not illustrated but are known in the art of drive mechanisms. The alternative hook stretching mechanism shown in FIG. 13 has certain advantages over the auger mechanism described earlier, since the hooks 412 tend to pull and stretch the cooked curd product more than the augers, which have a tendency to squeeze or press the cooked curd product to some extent and because the fibrous quality of the cheese product is enhanced by stretching and not by compressing, which tends to squeeze out butterfat.

What is claimed is:

1. A cheese cooking system comprising in combination:

a source of temperature-controlled hot water, tank means including a holding tank for receiving, containing, and discharging said hot water and for receiving sliced curd product from a tank receiving station, said tank means containing and cooking said sliced curd product in said hot water, and discharging cooked curd product to a tank discharge station, said holding tank defined by a vertical cylindrical side wall having a substantially vertical tank axis and a substantially horizontal bottom wall secured to said cylindrical side wall, said cylindrical side wall having a top rim in a plane substantially vertical to said bottom wall, means for delivering said sliced curd product to said tank receiving station, a first drive means associated with said tank means for moving said sliced curd product from said tank receiving station to said tank discharge station over a predetermined time, said sliced curd product having become partially cooked curd product upon reaching said tank discharge station, said first drive means including an upper rotatable mounting drum having a cylindrical upper drum side wall and an upper drum axis axially aligned with said holding tank axis, opposed substantially horizontal top and bottom upper drum covers, said top upper drum cover being substantially in a plane with said top rim of said tank; a lower rotatably mounted drum mounted under said upper drum and having a cylindrical lower drum side wall having a height and diameter approximately equal to a height and diameter of said upper drum, said lower drum having an axis axially aligned with said holding tank axis, and opposed substantially horizontal top and bottom lower drum covers, said bottom lower drum cover being rotatably associated with said bottom wall; said upper and lower drum cylindrical side walls, said cylindrical tank side wall, and said tank bottom wall forming a tank compartment; and a shaft having opposed upper and lower shaft portions, said upper shaft portion being axially mounted with and rotatably connected to said upper and lower drums, said lower shaft portion extending below said bottom wall, stretching means connected to said tank means for receiving said cooked curd product from said tank discharge station and for working said partially cooked curd product in said temperature-controlled hot water, said stretching means delivering said partially cooked curd product to a stretching means discharge station as a fibrous cheese product which is free of said hot water, and a second drive means for driving said stretching means.

2. The cheese cooking system according to claim 1, wherein said tank means further includes a circular flat shelf positioned substantially horizontally between and juxtaposed with said upper and lower drums and removably affixed to said tank side wall, said shelf forming a center aperture adapted to pass said upper shaft portion, wherein said tank compartment includes a lower compartment disposed below said shelf and an upper compartment disposed over said shelf, said upper and lower compartments being substantially equivalent in volume and configuration.

3. The cheese cooking system according to claim 2, wherein said tank means further includes a plurality of substantially vertical, flat, substantially rectangular paddles positioned in spaced relationship in said upper and lower comprtments and connected to said upper and lower drum cylindrical side walls and radially extending from said upper and lower drum cylindrical side walls to a position proximate to said tank cylindrical side wall, said paddles, said upper drum cylindrical side wall, said tank cylindrical side wall, and said supporting shelf forming a plurality of upper cavities in said upper compartment, and said paddles, said lower drum cylindrical side wall, said tank cylindrical side wall, and said bottom wall forming a plurality of lower cavities in said lower compartment, said upper and lower cavities being of substantially equal volume and configuration.

4. The cheese working system according to claim 3, wherein said plurality of paddles and said plurality of upper and lower cavities are equally distributed in said upper and lower compartments respectively, said upper compartment containing an upper paddle tier and said lower compartment containing a lower paddle tier, said upper tier including 8 paddles and forming 8 cavities, and said lower tier including 8 paddles and forming 8 cavities, wherein each cavity includes an angular distance of approximately 45 degrees and said upper and lower paddles and upper and lower cavities being vertically in paired alignment.

5. The cheese cooking system according to claim 4, wherein said shelf forms a first opening coextensive with any of said paired upper and lower cavities, whereby sliced curd product contained in an upper cavity that is rotated over said first opening descends through said opening to a coextensive lower cavity positioned under said first opening.

6. The cheese cooking system according to claim 5, wherein said first drive means includes indexing means connected to said shaft for moving said upper and lower tiers in uniform angular distance units of 45 degrees wherein said upper and lower cavities are always coextensive with said first opening.

7. The cheese cooking system according to claim 6, wherein said tank receiving station for said sliced curd product is disposed at a position aligned over an upper cavity, said first opening being positioned at approximately 270 degrees from said receiving station measured in the rotational movement of said shaft and said upper and lower paddle tiers.

8. The cheese working system according to claim 7, wherein said bottom wall forms a second opening, said tank discharge station being disposed at said second opening, said second opening being disposed at approximately 270 degrees from said first opening measured in the rotational direction of said shaft, and said upper and lower paddle tiers, said second opening being always disposed under one of said lower cavities, whereby cooked curd product descends from said second opening.

9. The cheese cooking system according to claim 8, wherein said stretching means includes an elongated chute connected to said said tank, said chute having a chute receiving portion and opposed chute discharge portion, said chute receiving portion being positioned under said second opening and said chute discharge portion being positioned horizontally distanced beyond said rim of said tank radially aligned with said second opening and vertically disposed above the plane of the rim of said tank.

10. The cheese cooking system according to claim 9, wherein said stretching means further includes auger means positioned between said chute receiving portion and said chute discharge portion, said auger means being for stretching said partially cooked product while simultaneously moving said partially cooked product from said receiving portion to said discharge portion as fibrous cheese product, said auger means including two parallel augers positioned in said chute.

11. The cheese cooking system according to claim 10, further including a frame disposed under said tank, and wherein said first drive means includes a first motor, and said second drive means includes a second motor, said first and second motors being mounted on said frame, said chute being further connected to said frame.

12. The cheese cooking system according to claim 11, wherein said indexing means includes a matched tooth ratchet connected to said lower portion of said shaft, a rod connected to said ratchet, an eccentric attached to said rod, gearing attached to said eccentric, and the drive shaft of said first motor being attached to said gearing, wherein said eccentric turns said rod at timed intervals and said ratchet rotates said shaft a determined angular distance at each of said intervals.

13. The cheese cooking system according to claim 12, further including a cheese cutting and delivery means associated with said tank for slicing matted curd product into said sliced curd product and delivering said sliced curd product to said receiving station of said tank, said cheese cutting and delivery means including means for receiving and holding matted curd product, cutter means connected to said receiving and holding means for slicing said matted curd product into sliced curd product, contact means for moving said matted curd product into slicing contact with said cutter means, means for rotating said cutter means, means associated with said cutter means for receiving sliced curd product and for directing said sliced curd product to said tank receiving station, and a third drive means for driving and returning said contact means.

14. The cheese cooking system according to claim 13, wherein said receiving and holding means comprises an elongated compartment having a curd receiving station and an opposed curd discharge station, and wherein said third drive means includes an air cylinder positioned outside said compartment proximate to said curd receiving station, said air cylinder including a cylinder drive rod extending substantially horizontally into said compartment; and a substantially vertical ram plate positioned in said compartment connected to the end of said drive rod, said ram plate being movable between said curd receiving station and said curd discharge station, said air cylinder and plate being capable of moving matted curd product from said curd receiving station to said curd discharge station, said air cylinder being capable of returning said ram plate from said curd discharge station to said curd receiving station.

15. The cheese cooking system according to claim 14, wherein said cutter means includes a substantially vertical cylindrical cutter body defined by a vertically cylindrical cutter side wall, said cylindrical cutter side wall, forming a plurality of substantially vertical slots having edges, said edges having outwardly extending cutting portions adapted to slice said matted curd product and pass said sliced curd product into said cutter body, said cutter means being positioned over said tank receiving station and said sliced curd product being directed by said cutter side wall to said tank receiving station.

16. The cheese cooking system according to claim 12, further including a sliced curd feeding means associated with said tank for receiving, quantifying and delivering sliced curd product to said tank receiving station, said sliced curd feeding means including a housing forming a hopper having a hopper receiving station for said sliced curd product, a chamber positioned below said hopper, and a hopper discharge station positioned below said chamber; rotatable means mounted in said chamber for receiving measured amounts of said sliced curd product from said hopper and delivering said measured amounts to said hopper discharge station; a fourth drive means for rotating said sliced curd feeding means; and actuation means for activating and deactivating said fourth drive means, said actuation means being electrically connected to said eccentric of said indexing means.

17. The cheese cooking system according to claim 16, wherein said rotatable means includes a horizontal drum disposed in said chamber, a shaft rotatably connected to said housing axially aligned with and connected to said drum and paddles and radially extending from said drum, said drum and said paddles forming means defining feeding cavities of approximately the same volume as said cavities of said tank, said feeding cavities being rotatable with respect to said hopper and with said discharge station by said indexing means.

18. The cheese cooking system according to claim 9, wherein said stretching means further includes at least one continuous conveyor positioned between said chute receiving portion and said chute discharge portion, a plurality of hook means connected to said conveyor for pulling said cooked curd product from said chute receiving portion to said chute discharge portion while simultaneously stretching said cooked curd product into fibrous curd product.

19. The cheese cooking system according to claim 9, wherein said upper and lower drums are substantially hollow and are buoyant in said holding tank when said holding tank is filled with said hot water, said tank means further including a tank cover adapted to be placed over said rim of said holding tank, wherein said tank cover is capable of holding down said upper and lower drums in said holding tank.

20. The cheese cooking system according to claim 9, wherein said upper and lower drums are substantially hollow and are buoyant in said holding tank when said holding tank is filled with said hot water, said tank means further including hold-down means associated with said upper shaft portion for holding down said upper and lower drums in said holding tank during operation of said cooking system, said hold-down means including a T-bar rod and means connected to said upper shaft portion and said T-bar rod for pressing said upper drum downwards upon rotation of said T-bar rod.

21. The cheese working system according to claim 9, wherein said upper shaft portion is square in cross-section, and said upper and lower drums form respective upper and lower apertures that are square in cross-section and are adapted to receive said upper shaft portion in sliding engagement wherein when said lower shaft portion is rotated said upper shaft portion rotates said upper and lower drums.

\* \* \* \* \*